(12) United States Patent
Hwang et al.

(10) Patent No.: US 12,487,000 B2
(45) Date of Patent: Dec. 2, 2025

(54) AIR CONDITIONER AND CONTROLLING METHOD THEREOF

(71) Applicant: SAMSUNG ELECTRONICS CO., LTD., Suwon-si (KR)

(72) Inventors: Jun Hwang, Suwon-si (KR); Hyungjin Kwon, Suwon-si (KR); Kyutae Park, Suwon-si (KR); Joonho Yoon, Suwon-si (KR); Sangwoo Lee, Suwon-si (KR); Sungjin Lim, Suwon-si (KR); Eunsung Jo, Suwon-si (KR); Hyeongkyu Cho, Suwon-si (KR); Youngju Joo, Suwon-si (KR); Hyoungseo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 498 days.

(21) Appl. No.: 17/717,758

(22) Filed: Apr. 11, 2022

(65) Prior Publication Data
US 2022/0404059 A1  Dec. 22, 2022

Related U.S. Application Data

(63) Continuation of application No. PCT/KR2022/004469, filed on Mar. 30, 2022.

(30) Foreign Application Priority Data

Jun. 22, 2021  (KR) .................. 10-2021-0080552

(51) Int. Cl.
*F24F 11/77* (2018.01)
*F24F 1/0033* (2019.01)
(Continued)

(52) U.S. Cl.
CPC ............ *F24F 11/77* (2018.01); *F24F 1/0033* (2013.01); *F24F 1/0059* (2013.01); *F24F 2110/10* (2018.01)

(58) Field of Classification Search
CPC .. F24F 11/77; F24F 11/63; F24F 11/64; F24F 1/0033; F24F 1/0059; F24F 1/005;
(Continued)

(56) References Cited

U.S. PATENT DOCUMENTS 10,852,010 B2  12/2020  Ha et al.
11,175,052 B2  11/2021  Ha et al.
(Continued)

FOREIGN PATENT DOCUMENTS

CN  103673084 A  3/2014
CN  106352401 A  1/2017
(Continued)

OTHER PUBLICATIONS

International Search Report dated Jul. 22, 2022, issued in International Application No. PCT/KR2022/004469.
(Continued)

*Primary Examiner* — Steven B McAllister
*Assistant Examiner* — Charles R Brawner
(74) *Attorney, Agent, or Firm* — STAAS & HALSEY LLP

(57) ABSTRACT

An air conditioner including an indoor unit housing; an indoor heat exchanger configured to exchange heat with air flowing into the indoor unit housing; a compressor configured to compress a refrigerant for a cooling operation or a heating operation performed by the air conditioner; a four-way valve configured to switch a circulation direction of the refrigerant based on whether the air conditioner is to perform the cooling operation or the heating operation; a first blower fan located in the indoor unit housing and configured (Continued)

to blow heat-exchanged air out of the indoor unit housing; a second blower fan located in the indoor unit housing at a higher position than the first blower fan and configured to blow heat-exchanged air out of the indoor unit housing; and a processor electrically connected to the compressor, the four-way valve, the first blower fan, and the second blower fan, and configured to, during the heating operation, adjust a rotational speed of the first blower fan to be higher than a rotational speed of the second blower fan.

16 Claims, 17 Drawing Sheets

(51) Int. Cl.
*F24F 1/0059* (2019.01)
*F24F 110/10* (2018.01)

(58) Field of Classification Search
CPC ........ F24F 2110/10; F24F 13/20; F24F 13/00; F24F 2013/205; Y02B 30/70; F25B 2313/02741
USPC .......................................................... 454/262
See application file for complete search history.

(56) References Cited

U.S. PATENT DOCUMENTS

| | | | |
|---|---|---|---|
| 11,193,677 | B2 | 12/2021 | Ha et al. |
| 12,146,668 | B2 | 11/2024 | Jeon et al. |
| 2016/0040896 | A1* | 2/2016 | Hong .................. F25B 5/02 165/221 |
| 2017/0023264 | A1* | 1/2017 | Ha ...................... F24F 11/46 |
| 2019/0186778 | A1* | 6/2019 | Cho .................... F24F 11/79 |
| 2022/0049854 | A1 | 2/2022 | Na et al. |
| 2023/0093074 | A1 | 3/2023 | Joo et al. |

FOREIGN PATENT DOCUMENTS

| | | | | |
|---|---|---|---|---|
| CN | 107003027 | A | | 8/2017 |
| CN | 109595691 | A | | 4/2019 |
| CN | 110762805 | A | * | 2/2020 |
| CN | 111207490 | A | * | 5/2020 ............ F24F 1/0014 |
| CN | 111207490 | B | | 4/2021 |
| JP | 2021-5134043 | | | 5/2021 |
| KR | 1999-004452 | | | 1/1999 |
| KR | 10-1003356 | B1 | | 12/2010 |
| KR | 10-1225985 | | | 1/2013 |
| KR | 10-1264779 | B1 | | 5/2013 |
| KR | 10-1590884 | B1 | | 2/2016 |
| KR | 10-1791056 | | | 10/2017 |
| KR | 10-1791056 | B1 | | 10/2017 |
| KR | 10-2018-0069599 | | | 6/2018 |
| KR | 10-2034104 | B1 | | 10/2019 |
| KR | 10-2020-0076936 | | | 6/2020 |
| KR | 10-2124831 | | | 7/2020 |
| KR | 10-2021-0049449 | | | 5/2021 |
| KR | 10-2022-0008427 | | | 1/2022 |
| KR | 10-2022-0099282 | | | 7/2022 |
| WO | WO 2020/125165 | A1 | | 6/2020 |
| WO | WO 2021/080191 | A1 | | 4/2021 |

OTHER PUBLICATIONS

European Search Report dated Sep. 12, 2024, in European Application No. 22828571.
Office Action dated Aug. 16, 2025, in Chinese Patent Application No. 202280012633.7.

* cited by examiner

COOLING OPERATION ⟶
HEATING OPERATION --▶

FIG.9

| ITEM | Case 1 AIRFLOW VOLUME (STRONG) | Case 2 AIRFLOW VOLUME (MEDIUM) |
|---|---|---|
| THIRD BLOWER FAN(163) | 1150 RPM | 1050 RPM |
| SECOND BLOWER FAN(162) | 1250 RPM | 1150 RPM |
| FIRST BLOWER FAN(161) | 1350 RPM | 1250 RPM |

| ITEM | HEATING OPERATION AIRFLOW VOLUME (STRONG) | COOLING OPERATION AIRFLOW VOLUME (STRONG) |
|---|---|---|
| THIRD BLOWER FAN(163) | 1150 RPM | 1350 RPM |
| SECOND BLOWER FAN(162) | 1250 RPM | 1250 RPM |
| FIRST BLOWER FAN(161) | 1350 RPM | 1150 RPM |

| EXAMPLE | HEATING RATE(TIME FROM 9℃ TO 20℃) |
|---|---|
| COMPARATIVE EXAMPLE(1400) | 27 MIN 26 SEC(100%) |
| EXPERIEMNTAL EXAMPLE 1(1500) | 25 MIN 26 SEC(93%) |
| EXPERIEMNTAL EXAMPLE 2(1600) | 21 MIN 25 SEC(78%) |

AIR CONDITIONER AND CONTROLLING METHOD THEREOF

CROSS-REFERENCE TO RELATED APPLICATIONS

This application is a continuation application filed under 35 U.S.C. § 111 (a), of International Application PCT/KR2022/004469, filed Mar. 30, 2022, it being further noted that foreign priority benefit is based upon Korean patent application 10-2021-0080552, filed Jun. 22, 2021, in the Korean Intellectual Property Office, the disclosures of which are incorporated by reference herein in their entireties.

BACKGROUND

1. Field

The present disclosure relates to an air conditioner capable of differently controlling operations of blower fans of an indoor unit in a cooling operation and a heating operation and a controlling method thereof.

2. Description of the Related Art

An air conditioner is an apparatus that cools or heats air using transfer of heat generated in a process of evaporating and condensing a refrigerant and conditions air of an indoor space by discharging the cooled or heated air. The air conditioner may cool or heat air by circulating a refrigerant through a compressor, an indoor heat exchanger, and an outdoor heat exchanger during a cooling operation or a heating operation.

In addition, the air conditioner may suck indoor air by operating a blower fan provided in an indoor unit, perform heat exchange of the sucked air in an indoor heat exchanger, and discharge heat-exchanged air into an indoor space.

In an air conditioner including a plurality of blower fans, the plurality of blower fans may operate at different rotational speeds. However, conventional air conditioners operate the blower fans in the same manner both in a cooling operation and a heating operation. For example, in a conventional air conditioner, a rotational speed of a blower fan located at the highest position is set to the highest level to blow an airflow farther away.

SUMMARY

In accordance with an aspect of the present disclosure, an air conditioner includes: an indoor unit housing; an indoor heat exchanger configured to exchange heat with air flowing into the indoor unit housing; a compressor configured to compress a refrigerant for a cooling operation or a heating operation performed by the air conditioner; a four-way valve configured to switch a circulation direction of the refrigerant based on whether the air conditioner is to perform the cooling operation or the heating operation; a first blower fan located in the indoor unit housing and configured to blow heat-exchanged air out of the indoor unit housing; a second blower fan located in the indoor unit housing at a higher position than the first blower fan and configured to blow heat-exchanged air out of the indoor unit housing; and a processor electrically connected to the compressor, the four-way valve, the first blower fan, and the second blower fan, and configured to, during the heating operation, adjust a rotational speed of the first blower fan to be higher than a rotational speed of the second blower fan.

The processor may be configured to, during the heating operation, adjust the rotational speed of the first blower fan to be higher than the rotational speed of the second blower fan during the heating operation and so that a difference between the rotational speed of the first blower fan and the rotational speed of the second blower fan meets a predetermined value based on a set airflow volume.

The processor may be configured to, during the cooling operation, adjust the rotational speed of the first blower fan to be lower than the rotational speed of the second blower fan.

The air conditioner may further include: a main outlet located at a front position of the indoor unit housing and configured to discharge heat-exchanged air flowing through a first flow path; a guide outlet located adjacent to the main outlet; and a circular fan located in the indoor unit housing and configured to blow air along a second flow path separated from the first flow path to the guide outlet, wherein the guide outlet is configured to discharge the air blow to the guide outlet in a forward direction of the indoor unit housing, and the processor is configured to control the circular fan based on a temperature of the heat-exchanged air discharged by the main outlet during the heating operation.

The processor may be configured to increase a rotational speed of the circular fan in response to an increase in the temperature of the heat-exchanged air discharged by the main outlet during the heating operation.

The processor may be configured to turn on the circular fan and operate the circular fan at a minimum rotational speed based on the temperature of the heat-exchanged air discharged by the main outlet during the heating operation reaching a first temperature.

The processor may be configured to operate the circular fan at a rotational speed higher than the minimum rotational speed and corresponding to a set airflow volume based on the temperature of the heat-exchanged air discharged by the main outlet during the heating operation reaching a second temperature higher than the first temperature.

The air conditioner may further include a temperature sensor located at a front panel of the indoor unit housing, a front surface of the indoor heat exchanger, or both the front panel of the indoor unit housing and the front surface of the indoor heat exchanger, and configured to measure a temperature of the heat-exchanged air discharged by the main outlet.

In accordance with another aspect of the present disclosure, an air conditioner includes: an indoor unit housing; an indoor heat exchanger configured to exchange heat with air introduced into the indoor unit housing; a first blower fan located in the indoor unit housing and configured to blow heat-exchanged air out of the indoor unit housing; a second blower fan located in the indoor unit housing at a higher position than the first blower fan, and configured to blow heat-exchanged air out of the indoor unit housing; and a processor configured to, during a heating operation of the air conditioner, adjust a rotational speed of the first blower fan to be higher than a rotational speed of the second blower fan, and, during a cooling operation of the air conditioner, adjust the rotational speed of the first blower fan to be lower than the rotational speed of the second blower fan.

The processor may be configured to adjust the rotational speed of the first blower fan and the rotational speed of the second blower fan so that a difference between the rotational speed of the first blower fan and the rotational speed of the second blower fan meets a predetermined value based on a set airflow volume.

The air conditioner may further include: a main outlet located at a front position of the indoor unit housing and configured to discharge heat-exchanged air flowing through a first flow path; a guide outlet located adjacent to the main outlet; and a circular fan located in the indoor unit housing and configured to blow air along a second flow path separated from the first flow path to the guide outlet, wherein the guide outlet is configured to discharge the air blown to the guide outlet in a forward direction of the indoor unit housing, and the processor is configured to control the circular fan based on a temperature of the heat-exchanged air discharged by the main outlet during the heating operation.

The processor may be configured to increase a rotational speed of the circular fan in response to an increase in the temperature of the heat-exchanged air discharged by the main outlet during the heating operation.

The processor may be configured to turn on the circular fan and operate the circular fan at a minimum rotational speed based on the temperature of the heat-exchanged air discharged by the main outlet during the heating operation of reaching a first temperature.

The processor may be configured to operate the circular fan at a rotational speed higher than the minimum rotational speed and corresponding to a set airflow volume based on the temperature of the heat-exchanged air discharged by the main outlet during the heating operation reaching a second temperature higher than the first temperature.

In accordance with another aspect of the present disclosure, a method is provided of controlling an air conditioner that includes an indoor unit housing, and a plurality of blower fans arranged in the indoor housing unit with a first blower fan of the plurality of blower fans being at a lower position than a second blower fan of the plurality of blower fans, the method including: operating the plurality of blower fans to discharge heat-exchanged air out of the indoor unit housing; and, during a heating operation performed by the air conditioner, adjusting a rotational speed of the first blower fan to be higher than a rotational speed of the second blower fan.

The method may further including, during a cooling operation performed by the air conditioner, adjusting the rotational speed of the first blower fan to be lower than the rotational speed of the second blower fan.

The rotational speed of the first blower fan and the rotational speed of the second blower fan may be adjusted so that a difference between the rotational speed of the first blower fan and the rotational speed of the second blower fan meets a predetermined value based on a set airflow volume.

BRIEF DESCRIPTION OF THE DRAWINGS

Aspects, features, and advantages of certain embodiments of the present disclosure will be more apparent from the following description taken in conjunction with the accompanying drawings, in which:

FIG. 9 is a table showing rotational speeds of blower fans in accordance with set airflow volumes during a heating operation.

FIG. 17 is a table showing heating speeds of Comparative Example, Experimental Example 1, and Experimental Example 2.

DETAILED DESCRIPTION

Figure 1:
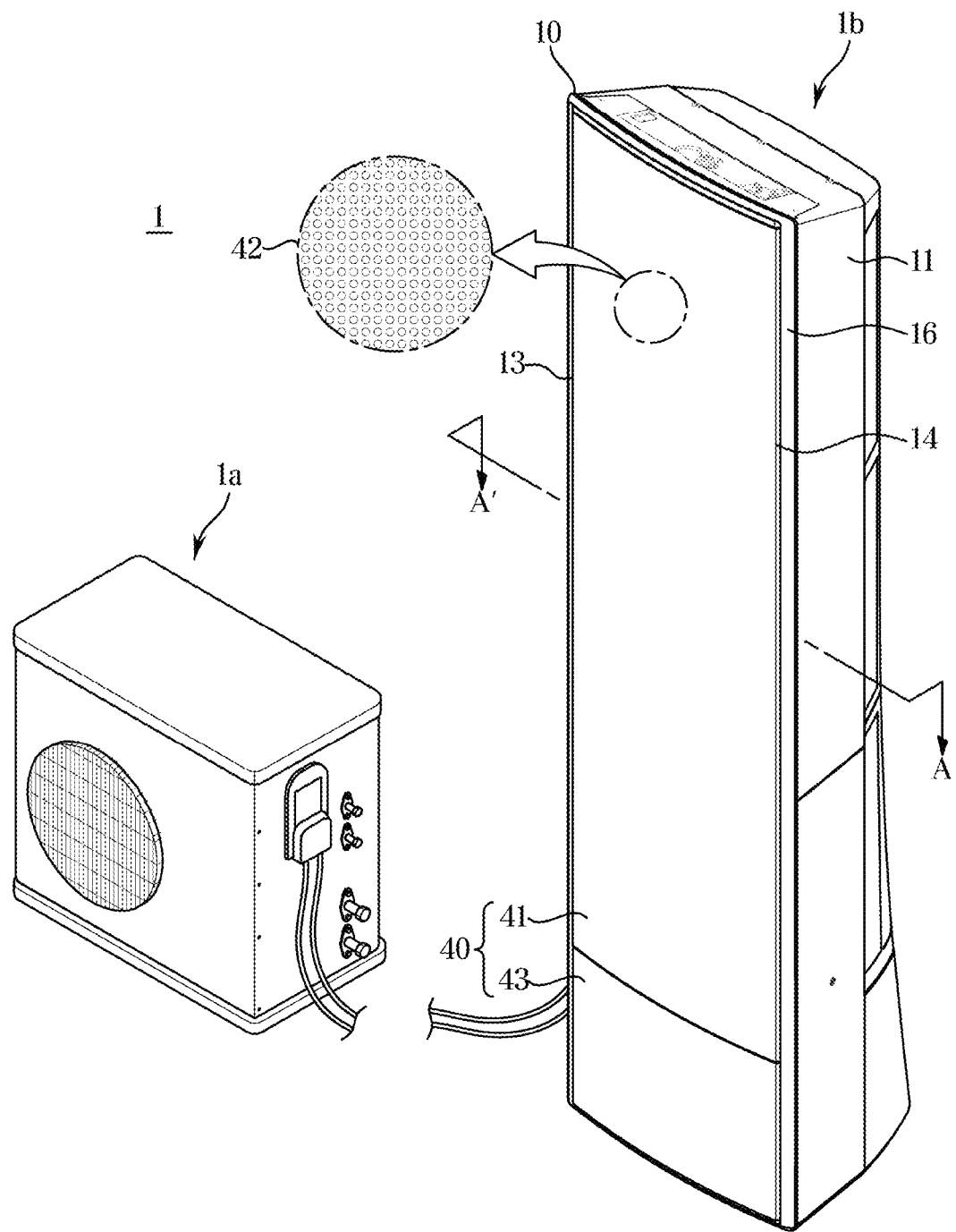
FIG. 1 is an exterior view of an air conditioner according to an embodiment.

Reference will now be made in detail to the embodiments of the present disclosure, examples of which are illustrated in the accompanying drawings. The embodiments described in the specification and shown in the drawings are only illustrative and are not intended to represent all aspects of the disclosure, such that various modifications may be made without departing from the spirit of the disclosure.

Throughout the specification, when an element is referred to as being "connected to" another element, it may be directly or indirectly connected to the other element and the "indirectly connected to" includes connected to the other element via a wireless communication network.

Also, the terms used herein are merely used to describe particular embodiments, and are not intended to limit the present disclosure. An expression used in the singular encompasses the expression of the plural unless it has a clearly different meaning in the context. Throughout the specification, it is to be understood that the terms such as "including" or "having" are intended to indicate the existence of features, numbers, operations, components, parts, elements, or combinations thereof disclosed in the specification, and are not intended to preclude the possibility that one or more other features, numbers, operations, components, parts, elements, or combinations thereof may exist or may be added.

Also, it will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component.

In addition, the terms "unit", "device", "block", "member", and "module" used herein refer to a unit used to process at least one function or operation. For example, these terms may refer to one or more hardware components such as field-programmable gate array (FPGA) or application specific integrated circuit (ASIC), one or more software components stored in a memory, or one or more processors.

The reference numerals used in operations are used for descriptive convenience and are not intended to describe the order of operations and the operations may be performed in a different order unless otherwise stated.

Disclosed herein are an air conditioner and method capable of reducing temperature stratification of indoor air by increasing a rotational speed of a blower fan located at a lower position during a heating operation and a method of controlling the same.

Disclosed herein are an air conditioner and method differently controlling operations of blower fans located in an indoor unit in a cooling operation and a heating operation and a method of controlling the same.

Disclosed herein are an air conditioner and method capable of controlling an operation of a circular fan located in an indoor unit based on a temperature of heat-exchanged air in a heating operation and a method of controlling the same. According to the air conditioner and the method of controlling the same according to an embodiment, temperature stratification of the indoor air may be reduced and the heating rate may be increased by increasing the rotational speed of the blower fan located at a lower position during the heating operation.

According to the air conditioner and the method of controlling the same according to an embodiment, the operations of the blower fans located in the indoor unit may be controlled differently during the cooling operation and the heating operation.

According to the air conditioner and the method of controlling the same according to an embodiment, user's satisfaction with the airflow discharged from the air conditioner may be improved by controlling the operation of the circular fan located in the indoor unit based on the temperature of the heat-exchanged air during the heating operation. In addition, temperature stratification of the indoor air may be reduced and the heating rate may be increased by the operation of the circular fan.

Hereinafter, embodiments of the present disclosure will be described in detail with reference to the accompanying drawings.

Figure 2:
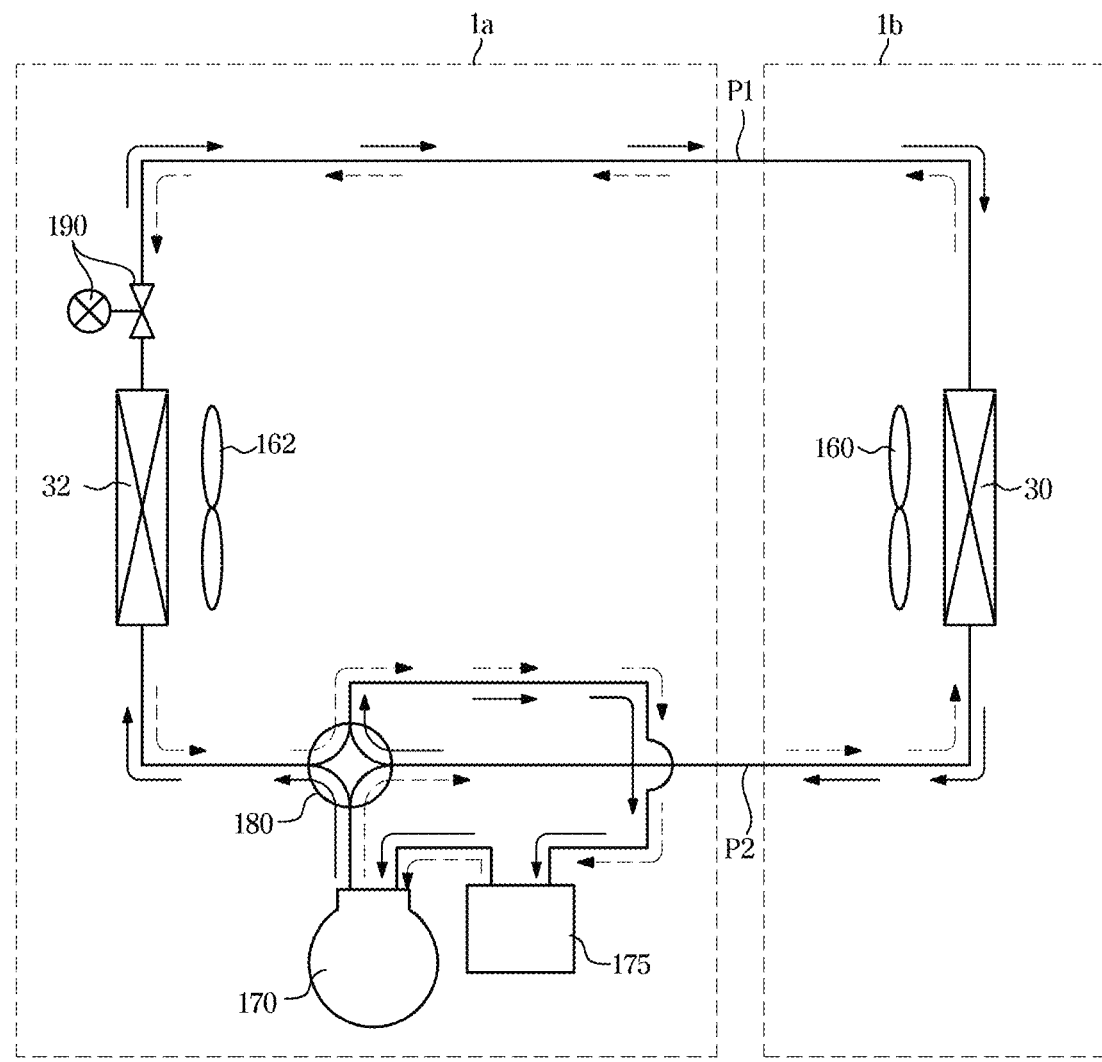
FIG. 2 shows a flow of a refrigerant during a heating operation or cooling operation of an air conditioner according to an embodiment.
Figure 3:
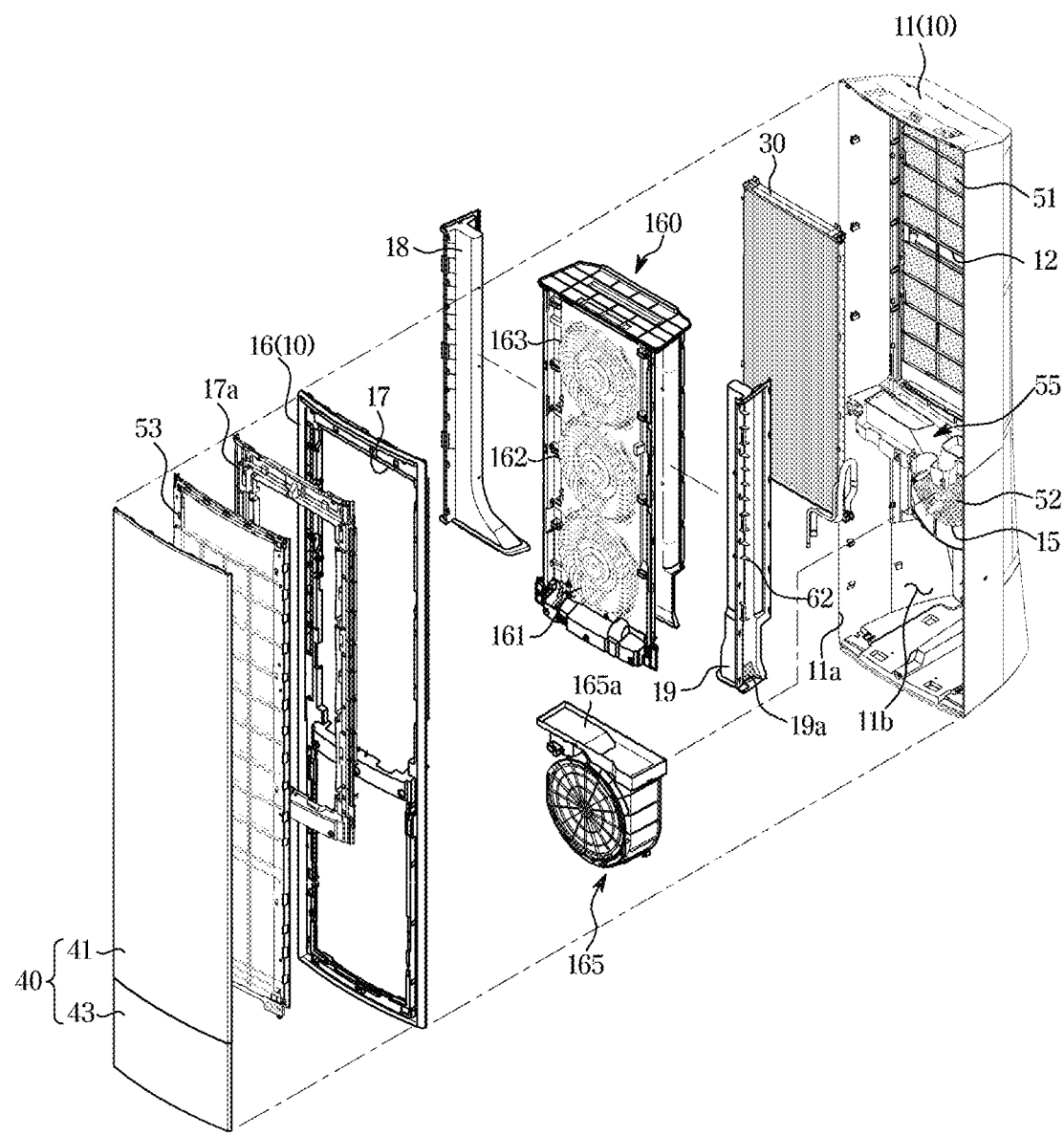
FIG. 3 is an exploded view of an air conditioner according to an embodiment.
Figure 4:
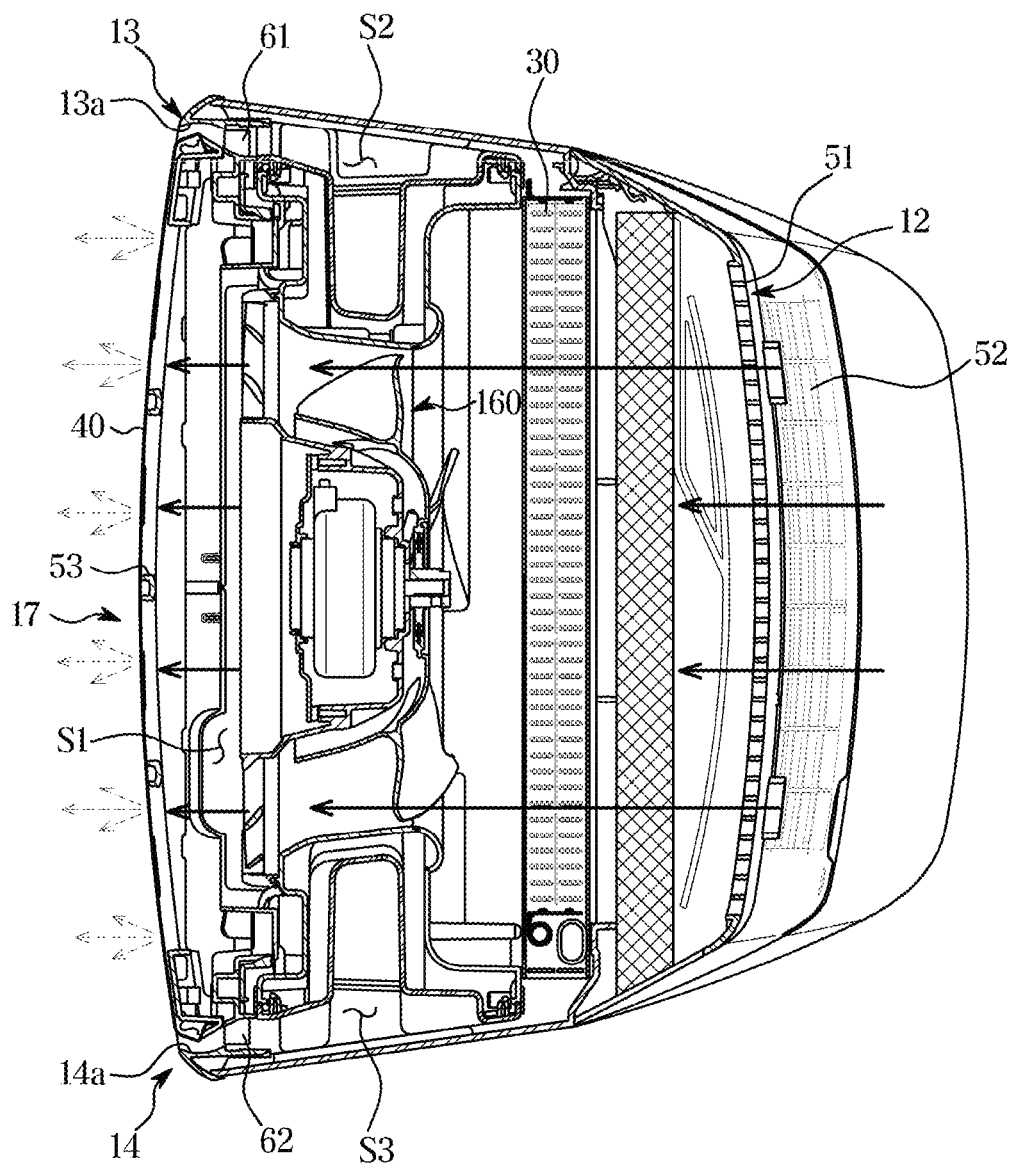
FIG. 4 is a cross-sectional view of an air conditioner according to an embodiment illustrating a flow of air through a first flow path.
Figure 5:
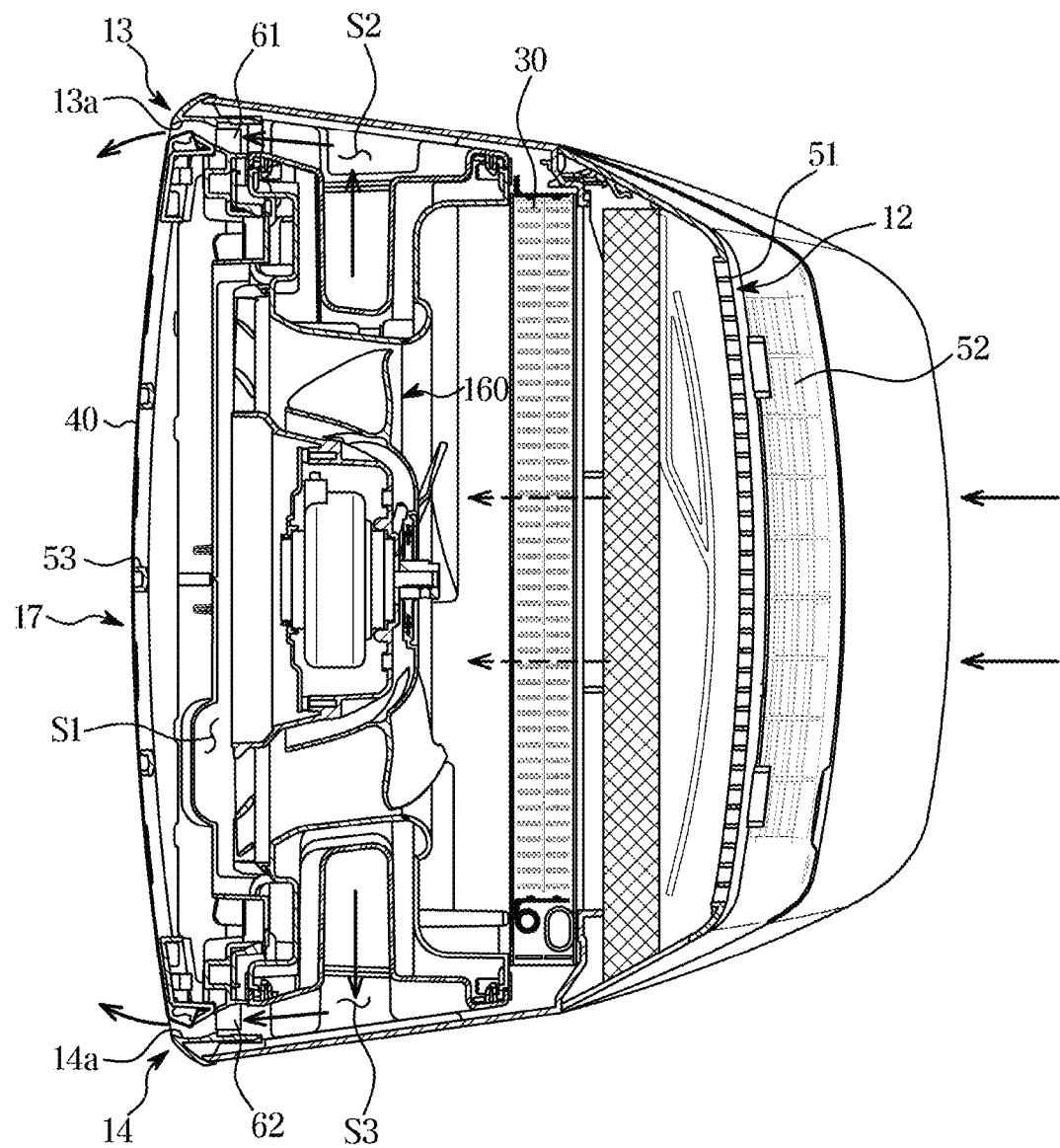
FIG. 5 is a cross-sectional view of an air conditioner according to an embodiment illustrating flows of air through a second flow path and a third flow path.

FIG. 1 is an exterior view of an air conditioner according to an embodiment. FIG. 2 shows a flow of a refrigerant during a heating operation or a cooling operation of an air conditioner according to an embodiment. FIG. 3 is an exploded view of an air conditioner according to an embodiment. FIG. 4 is a cross-sectional view of an air conditioner according to an embodiment illustrating an airflow through a first flow path. FIG. 5 is a cross-sectional view of an air conditioner according to an embodiment illustrating airflows through a second flow path and a third flow path.

Referring to FIG. 1, an air conditioner 1 includes an outdoor unit 1*a* provided in an outdoor space and configured to perform heat exchange between outdoor air and a refrigerant and an indoor unit 1*b* provided in an indoor space and configured to perform heat exchange between indoor air and the refrigerant. The outdoor unit 1*a* may be located out of an air conditioning space, and the indoor unit 1*b* may be located in the air conditioning space. The air conditioning space refers to a space to be cooled or heated by the air conditioner 1. For example, the outdoor unit 1*a* may be located outside a building, and the indoor unit 1*b* may be located inside a space separated from the outside by walls such as a living room or an office.

Referring to FIG. 2, the air conditioner 1 includes a refrigerant flow path for circulating the refrigerant between the indoor unit 1*b* and the outdoor unit 1*a*. The refrigerant may absorb or emit heat by phase change (e.g., change from a gas-phase to a liquid-phase and change from a liquid-phase to a gas-phase) while circulating between the indoor unit 1*b* and the outdoor unit 1*a* along the refrigerant flow path. The air conditioner 1 includes a liquid pipe P1 connecting the outdoor unit 1*a* with the indoor unit 1*b* and serving as a channel for the liquid-phase refrigerant flow and a gas pipe P2 for the gas-phase refrigerant flow. The liquid pipe P1 and the gas pipe P2 extend into the outdoor unit 1*a* and the indoor unit 1*b*.

The outdoor unit 1*a* includes a compressor 170 configured to compress the refrigerant, an outdoor heat exchanger 32 configured to perform heat exchange between outdoor air and the refrigerant, a four-way valve 180 configured to guide the refrigerant compressed by the compressor 170 toward the outdoor heat exchanger 32 or an indoor heat exchanger 30 based on a cooling operation or a heating operation, an expansion valve 190 configured to decompress the refrigerant, and an accumulator 175 configured to prevent the refrigerant, which has not been evaporated, from entering the compressor 170.

The compressor 170 may operate upon receiving electrical energy from an external power source. The compressor 170 includes a compressor motor (not shown) and compresses a low-pressure gas-phase refrigerant by a high-pressure using a rotational force of the compressor motor.

The four-way valve 180 guides the refrigerant compressed by the compressor 170 to the outdoor heat exchanger 32 during the cooling operation and guides the refrigerant compressed by the compressor 170 to the indoor unit 1*b* during the heating operation.

The outdoor heat exchanger 32 condenses the refrigerant compressed by the compressor 170 during the cooling operation and evaporates the refrigerant decompressed by the indoor unit 1*b* during the heating operation. The outdoor heat exchanger 32 may include an outdoor heat exchanger refrigerant tube (not shown) through which the refrigerant passes and outdoor heat exchanger cooling fins (not shown) to enlarge a surface area in contact with outdoor air. As the surface area between the outdoor heat exchanger refrigerant tube (not shown) and outdoor air is enlarged, heat exchange efficiency between the refrigerant and outdoor air may be increased.

The outdoor blower fan 162 may be provided near the outdoor heat exchanger 32 and allow outdoor air to flow in the outdoor heat exchanger 32. The outdoor blower fan 162 may blow outdoor air simultaneously blowing heat-exchanged air to the outside to be heat-exchanged toward the outdoor heat exchanger 32.

The expansion valve 190 may adjust an amount of the refrigerant supplied to the outdoor heat exchanger 32 not only to decompress the refrigerant but also to sufficiently perform heat exchange in the outdoor heat exchanger 32. Specifically, the expansion valve 190 decompresses the refrigerant by using the throttling effect of the refrigerant obtained when the refrigerant is decompressed while passing through a narrow flow channel without heat exchange with an external environment. An electronic expansion valve (EEV) whose degree of opening is adjustable, may be used to control the amount of the refrigerant passing through the expansion valve 190.

The indoor unit 1*b* may further include the indoor heat exchanger 30 and a blower fan assembly 160. The indoor heat exchanger 30 performs heat exchange between indoor air and the refrigerant. The blower fan assembly 160 may allow the indoor air to flow in the indoor heat exchanger 30. The blower fan assembly 160 may include a plurality of indoor blower fans 161, 162, and 163.

The indoor heat exchanger 30 evaporates a low-pressure liquid-phase refrigerant during a cooling operation and condenses a high-pressure gas-phase refrigerant during a heating operation. Like the outdoor heat exchanger 32 of the outdoor unit 1*a*, the indoor heat exchanger 30 includes an indoor heat exchanger refrigerant tube (not shown) through which the refrigerant passes and indoor heat exchanger cooling fins (not shown) to increase heat exchange efficiency between the refrigerant and indoor air.

The blower fan assembly 160 may be provided near the indoor heat exchanger 30 and allow indoor air to flow in the indoor heat exchanger 30. The indoor heat exchanger 30 may exchange heat with the indoor air. The blower fan assembly 160 may blow heat-exchanged air into the indoor space simultaneously blowing indoor air to be heat-exchanged to the indoor heat exchanger 30.

During the cooling operation, the refrigerant may emit heat in the outdoor heat exchanger 32 and absorb heat in the indoor heat exchanger 30. That is, during the cooling operation, the refrigerant compressed by the compressor 170 is first supplied to the outdoor heat exchanger 32 via the four-way valve 180 and then supplied to the indoor heat exchanger 30. In this case, the outdoor heat exchanger 32 may operate as a condenser to condense the refrigerant, and the indoor heat exchanger 30 may operate as an evaporator to evaporate the refrigerant.

During the cooling operation, the high-temperature, high-pressure gas-phase refrigerant discharged from the compressor 170 moves to the outdoor heat exchanger 32, the liquid-phase or liquid-like refrigerant condensed by the outdoor heat exchanger 32 is expanded and decompressed by the expansion valve 190, and the two-phase refrigerant passing through the expansion valve 190 moves to the indoor heat exchanger 30. The refrigerant introduced into the indoor heat exchanger 30 exchanges heat with air and is evaporated. Thus, the temperature of the heat-exchanged air decreases and cooling air is discharged out of the indoor unit 1*b*.

During the heating operation, the refrigerant may emit heat in the indoor heat exchanger 30 and absorb heat in the outdoor heat exchanger 32. That is, during the heating operation, the refrigerant compressed by the compressor 170 is first supplied to the indoor heat exchanger 30 via the four-way valve 180 and then supplied to the outdoor heat exchanger 32. In this case, the indoor heat exchanger 30 may operate as a condenser to condense the refrigerant, and the outdoor heat exchanger 32 may operate as an evaporator to evaporate the refrigerant.

During the heating operation, the high-temperature, high-pressure gas-phase refrigerant discharged from the compressor 170 moves to the indoor heat exchanger 30, and the high-temperature, the high-pressure gas-phase refrigerant passing through the indoor heat exchanger 30 exchanges heat with low-temperature dry air. The refrigerant emits heat while being condensed to the liquid-phase or liquid-like refrigerant, and heating air is discharged out of the indoor unit 1*b* as air absorbs heat.

Hereinafter, a structure of the indoor unit 1*b* will be described in detail.

Referring to FIGS. 1 and 3, the indoor unit 1*b* may include a housing 10 defining an exterior appearance, a blower fan assembly 160 configured to circulate air into or out of the housing 10, and an indoor heat exchanger 30 configured to exchange heat with air flowing into the housing 10. The housing 10 may also be referred to as 'indoor unit housing'.

The housing 10 may include a body case 11 in which the blower fan assembly 160 and the heat exchanger 30 are mounted and a front panel 40 covering the front surface of the body case 11. Also, the housing 10 may include a first inlet 12, a second inlet 15, a main outlet 17, and guide outlets 13 and 14.

The body case 11 may define the rear surface, the left surface, the right surface, the upper surface, and the bottom surface of the indoor unit 1*b*. The front surface of the body case 11 is open, and the open front surface may form a body case opening 11*a*. The body case opening 11*a* may be covered with a first frame 16, a second frame 53, a support frame 17*a*, and the front panel 40.

The front panel 40 may be coupled to the housing 10 by the first frame 16. The front panel 40 may include a discharge area 41 including a plurality of holes 42 and a blocking area 43 not including the plurality of holes 42. The plurality of hoes 42 may penetrate the front panel 40. The plurality of hoes 42 may be uniformly distributed over the entire area. Heat-exchanged air passing through the main outlet 17 may be discharged out of the housing 10 through the plurality of hoes 42. A wind speed of heat-exchanged air discharged through the plurality of hoes 42 may be relatively low compared to a wind speed of air discharged through the guide outlets 13 and 14. Because the blocking area 43 does not have holes, air cannot pass through the blocking area 43.

The first frame 16 may be coupled to the front surface of the body case 11, i.e., the body case opening 11*a*. The second frame 53 may be coupled to the front surface of the first frame 16. The support frame 17*a* may be located between the first frame 16 and the second frame 53 to support the first frame 16 and the second frame 53. The first frame 16 and the front panel 40 may be detachable from the body case 11.

The first frame 16 may include the main outlet 17. The main outlet 17 may be located at a front position of the housing 10. The main outlet 17 may penetrate the first frame 16. The main outlet 17 may be formed at an upper portion of the first frame 16. The main outlet 17 may be arranged to face the first inlet 12. Air heat-exchanged air in the housing 10 may be discharged out of the housing 10 through the main outlet 17. The main outlet 17 may discharge air introduced through the first inlet 12.

The support frame 17*a* supporting the front panel 40 may be coupled to a portion of the first frame 16 having the main outlet 17. The support frame 17*a* may extend along the periphery of the main outlet 17. The support frame 17*a* may support the rear surface of the front panel 40.

The first inlet 12 formed at the body case 11 may penetrate the rear surface of the body case 11. The first inlet 12 may be formed at an upper position of the rear surface of the body case 11. External air may be introduced into the housing 10 through the first inlet 12.

At least one first inlet 12 may be provided or a plurality of first inlets 12 may also be provided according to a design thereof. The first inlet 12 may have a rectangular shape. The shape of the first inlet 12 may vary according to the design thereof.

The second inlet 15 may penetrate the rear surface of the body case 11 and may be formed at a lower portion of the rear surface of the body case 11. The second inlet 15 may be formed below the first inlet 12. External air may be introduced into the housing 10 through the second inlet 15. The number and shape of the second inlet 15 may vary according to a design thereof.

The first frame 16 may constitute the guide outlets 13 and 14 together with the front panel 40. The guide outlets 13 and 14 may be formed at the same surface as that of the main outlet 17. The guide outlets 13 and 14 may be located adjacent to the main outlet 17. The guide outlets 13 and 14 may be located to be spaced apart from the main outlet 17 by a predetermined distance. The guide outlets 13 and 14 may be formed on the left and/or right sides of the main outlet 17. The guide outlets 13 and 14 may include a first guide outlet 13 located on the left side of the main outlet 17 and a second guide outlet 14 located on the right side of the main outlet 17.

The guide outlets 13 and 14 may extend along a longitudinal direction of the body case 11. The guide outlets 13 and 14 may have the same length as that of the main outlet 17. Air which is not heat-exchanged in the housing 10 may be discharged out of the housing 10 through the guide outlets 13 and 14. The guide outlets 13 and 14 may discharge air introduced through the second inlet 15.

Referring to FIGS. 4 and 5, the guide outlets 13 and 14 may be configured to mix the air discharged through the guide outlets 13 and 14 with the air discharged through the main outlet 17. In more detail, the first frame 16 constituting the guide outlets 13 and 14 may include guide curved surfaces 13a and 14a at portions thereof to guide the air discharged through the guide outlets 13 and 14 such that the air discharged through the guide outlets 13 and 14 is mixed with the air discharged through the main outlet 17.

The air discharged through the guide outlets 13 and 14 may be discharged along the guide curved surfaces 13a and 14a in a direction to be mixed with the air discharged through the main outlet 17. The guide curved surfaces 13a and 14a may guide the air discharged through the guide outlets 13 and 14 in the same direction as that of the air the air discharged through the main outlet 17. The guide curved surfaces 13a and 14a may be provided to guide the air discharged through the guide outlets 13 and 14 forward.

Blades 61 and 62 to guide the air discharged through the guide outlets 13 and 14 may be provided at the guide outlets 13 and 14. The blades 61 and 62 may be located continuously along the longitudinal direction of the guide outlets 13 and 14. A first blade 61 may be located at the first guide outlet 13, and a second blade 62 may be located at the second guide outlet 14.

An airflow path connecting the first inlet 12 to the main outlet 17 is referred to as first flow path S1, an airflow path connecting the second inlet 15 to the first guide outlet 13 is referred to as second flow path S2, and an airflow path connecting the second inlet 15 to the second guide outlet 14 is referred to as third flow path S3. The first flow path S1 may be separated from the second flow path S2 and the third flow path S3. In the indoor unit 1b, air flowing along the first flow path S1 may not be mixed with air flowing along the second flow path S2 and the third flow path S3. The second flow path S2 and the third flow path S3 may partially overlap each other. In the second flow path S2 and the third flow path S3, a section from the second inlet 15 and a circular fan 165 may be shared thereby.

Referring back to FIG. 3, a first duct 18 separating the first flow path S1 from the second flow path S2 may be located in the housing 10. The first duct 18 may be located on the left side of the blower fan assembly 160. The first duct 18 may extend in the longitudinal direction. The first duct 18 may communicate with the circular fan 165. The first duct 18 may communicate with a fan outlet 165a of the circular fan 165. The first duct 18 may guide a portion of air flowing by the circular fan 165 to a first guide outlet 13. The first duct 18 may be provided with a first duct filter (not shown) to filter out foreign matter of the air flowing from the circular fan 165.

In the housing 10, a second duct 19 separating the first flow path S1 from the third flow path S3 may be located. The second duct 19 may be located on the right side of the blower fan assembly 160. The second duct 19 may extend in the longitudinal direction. The second duct 19 may communicate with the circular fan 165. The second duct 19 may communicate with a fan outlet 165a of the circular fan 165. The second duct 19 may guide a portion of air flowing by the circular fan 165 to the second guide outlet 14. The second duct 19 may be provided with a second duct filter 19a to filter out foreign matter of the air flowing from the circular fan 165.

Air heat-exchanged with the indoor heat exchanger 30 may be discharged through the main outlet 17 and air which has not passed through the heat exchanger 30 may be discharged through the guide outlets 13 and 14. That is, the guide outlets 13 and 14 may be provided to discharge non-heat-exchanged air. Because the indoor heat exchanger 30 is located on the first flow path S1, the air discharged through the main outlet 17 may be heat-exchanged air. Because the indoor heat exchanger 30 is not located in the second flow path S2 and the third flow path S3, the air discharged through the guide outlets 13 and 14 may be non-heat-exchanged air.

In another embodiment, a heat exchanger (not shown) may also be located in the second flow path S2 and the third flow path S3. For example, a heat exchanger (not shown) may be provided in an accommodation space 11b of the body case 11. When a heat exchanger (not shown) is located in the second flow path S2 and the third flow path S3, heat-exchanged air may also be discharged through the guide outlets 13 and 14.

Electric components (not shown) may be located in the accommodation space 11b of the body case 11. For example, a driving circuit and/or a control circuit required to drive the air conditioner 1 may be located therein. In addition, the circular fan 165 may be located in the accommodation space 11b.

The circular fan 165 may be driven independently of the blower fan assembly 160. The rotational speed of the circular fan 165 may be different from a rotational speed of each of the plurality of blower fans 161, 162, and 163 included in the blower fan assembly 160.

The blower fan assembly 160 may be located in the first flow path S1 from the first inlet 12 to the main outlet 17. Air may be introduced into the housing 10 through the first inlet 12 by the operation of the blower fan assembly 160. Air introduced through the first inlet 12 may flow along the first flow path S1 to be discharged out of the housing 10 through the main outlet 17.

The blower fan assembly 160 may include at least one blower fan. For example, the blower fan assembly 160 may include a first blower fan 161, a second blower fan 162, and a third blower fan 163. Although three blower fans 161, 162, and 163 are exemplarily shown in FIG. 3, the blower fan assembly 160 may also include two blower fans or various numbers of blower fans according to a design thereof.

The first blower fan 161, the second blower fan 162, and the third blower fan 163 may be aligned in the longitudinal direction of the indoor unit housing 10. In the blower fan assembly 160, the first blower fan 161 may be located at the lowest position, the third blower fan 163 may be located at the highest position, and the second blower fan 162 may be located between the first blower fan 161 and the third blower fan 162. The first blower fan 161, the second blower fan 162, and the third blower fan 163 may have the same structure.

The blower fans 161, 162, and 163 may include an axial-flow fan or a mixed-flow fan. In addition, the blower fans 161, 162, and 163 may be formed in various shapes and/or types of fans capable of discharging air introduced into the housing 10 out of the housing 10 again. For example, the blower fans 161, 162, and 163 may be a cross fan, a turbo fan, or a sirocco fan.

The circular fan 165 may be located in the second flow path S2 and the third flow path S3 connecting the second inlet 15 to the guide outlets 13 and 14. Air may flow into the housing 10 through the second inlet 15 by the circular fan 165. A portion of air introduced through the second inlet 15 may flow along the second flow path S2 to be discharged out of the housing 10 through the first guide outlet 13 or flow along the third flow path S3 to be discharged out of the housing 10 through the second guide outlet 14.

The indoor heat exchanger 30 may be located between the blower fan assembly 160 and the first inlet 12. The indoor heat exchanger 30 may be located in the first flow path S1. The indoor heat exchanger 30 may absorb heat from air introduced through the first inlet 12 or emit heat to the air introduced through the first inlet 12. The indoor heat exchanger 30 may include a tube and a header coupled to the tube. However, types of the indoor heat exchanger 30 are not limited thereto.

The indoor unit 1b may include a first suction grille 51 coupled to the body case 11 at a portion where the first inlet 12 is formed. The first suction grille 51 may be provided to prevent foreign matter from entering through the first inlet 12. To this end, the first suction grille 51 may include a plurality of slits or holes. The first suction grille 51 may be formed to cover the first inlet 12.

The indoor unit 1b may include a second suction grille 52 coupled to the body case 11 at a portion where the second inlet 15 is formed. The second suction grille 52 may be provided to prevent foreign matter from entering through the second inlet 15. To this end, the second suction grille 52 may include a plurality of slits or holes. The second suction grille 52 may be provided to cover the second inlet 15.

The indoor unit 1b may include the second frame 53 coupled to a portion of the first frame 16. The second frame 53 may be mounted on the support frame 17a. The second frame 53 may be provided to prevent the foreign matter from being discharged through the main outlet 17. To this end, the second frame 53 may include a plurality of slits or holes. The second frame 53 may be formed to cover the main outlet 17.

The indoor unit 1b may include a distribution device 55. The distribution device 55 may be located in the housing 10. For example, the distribution device 55 may be located in the accommodation space 11b of the body case 11. The distribution device 55 may be located adjacent to the fan outlet 165a of the circular fan 165. The distribution device 55 may be located at a position where air introduced through the second inlet 15 is divided into the first guide outlet 13 and the second guide outlet 14. The distribution device 55 may be located between the first inlet 12 and the second inlet 15. The distribution device 55 may be configured to divide air blown by the circular fan 165 into the first duct 18 and the second duct 19. The distribution device 55 may be configured to control airflow volumes discharged through the first guide outlet 13 and the second guide outlet 14.

Referring back to FIG. 4, the air conditioner 1 may operate in a first mode in which heat-exchanged air is discharged through the main outlet 17. In the first mode, by the operation of the blower fan assembly 160, external air may be introduced into the housing 10 through the first inlet 12 and the introduced air may be heat-exchanged while passing through the heat exchanger 30. The heat-exchanged air may be discharged out of the housing 10 through the main outlet 17. The wind speed of the heat-exchanged air may decrease while passing through the plurality of holes 42 of the front panel 40. According to this configuration, the indoor space may be cooled or heated at a wind speed at which a user feels comfortable. Because the circular fan 165 is not driven in the first mode, air is not discharged through the guide outlets 13 and 14.

Referring back to FIG. 5, the air conditioner 1 may operate in a second mode in which non-heat-exchanged air is discharged through the guide outlets 13 and 14. Because a heat exchanger is not located in the second flow path S2 and the third flow path S3, the indoor unit 1b may circulate indoor air. Because the guide outlets 13 and 14 are provided with the guide curved surfaces 13a and 14a, the air discharged through the guide outlets 13 and 14 may be discharged in a forward direction of the indoor unit 1b. Because the guide outlets 13 and 14 are provided with the blades 61 and 62, the air may be blown farther therefrom.

As the circular fan 165 is driven, external air of the housing 10 may be introduced into the housing 10 through the second inlet 15. The air introduced into the housing 10 may flow into the second flow path S2 and the third flow path S3 respectively formed on both sides of the first flow path S1 after passing through the circular fan 165. In the second flow path S2 and the third flow path S3, air flows upward and then is discharged out of the housing 10 through the guide outlets 13 and 14. In this case, air may be guided in the forward direction of the air conditioner 1 along the guide curved surfaces 13a and 14a.

Because the blower fan assembly 160 is not driven in the second mode, air is not discharged through the main outlet 17. That is, because air that is not heat-exchanged is blown in the second mode, the air conditioner 1 may simply perform the function of circulating indoor air.

In addition, the air conditioner 1 may also operate in a third mode in which heat-exchanged air is discharged through the main outlet 17 and non-heat-exchanged air is discharged through the guide outlets 13 and 14. The air conditioner 1 may blow cooling air or heating air farther in the third mode than the first mode.

When the air conditioner 1 operates in the third mode, the cooling air or heating air discharged through the main outlet 17 may be mixed with the air discharged through the guide outlets 13 and 14. Furthermore, the air discharged through the guide outlets 13 and 14 may move at a relatively high wind speed compared to the heat-exchanged air discharged through the main outlet 17. The air discharged through the guide outlets 13 and 14 may move farther the heat-exchanged air discharged through the main outlet 17. According to this configuration, the air conditioner 1 may provide the user with pleasant cooling air or heating air in which heat-exchanged air and indoor air are mixed.

Figure 6:
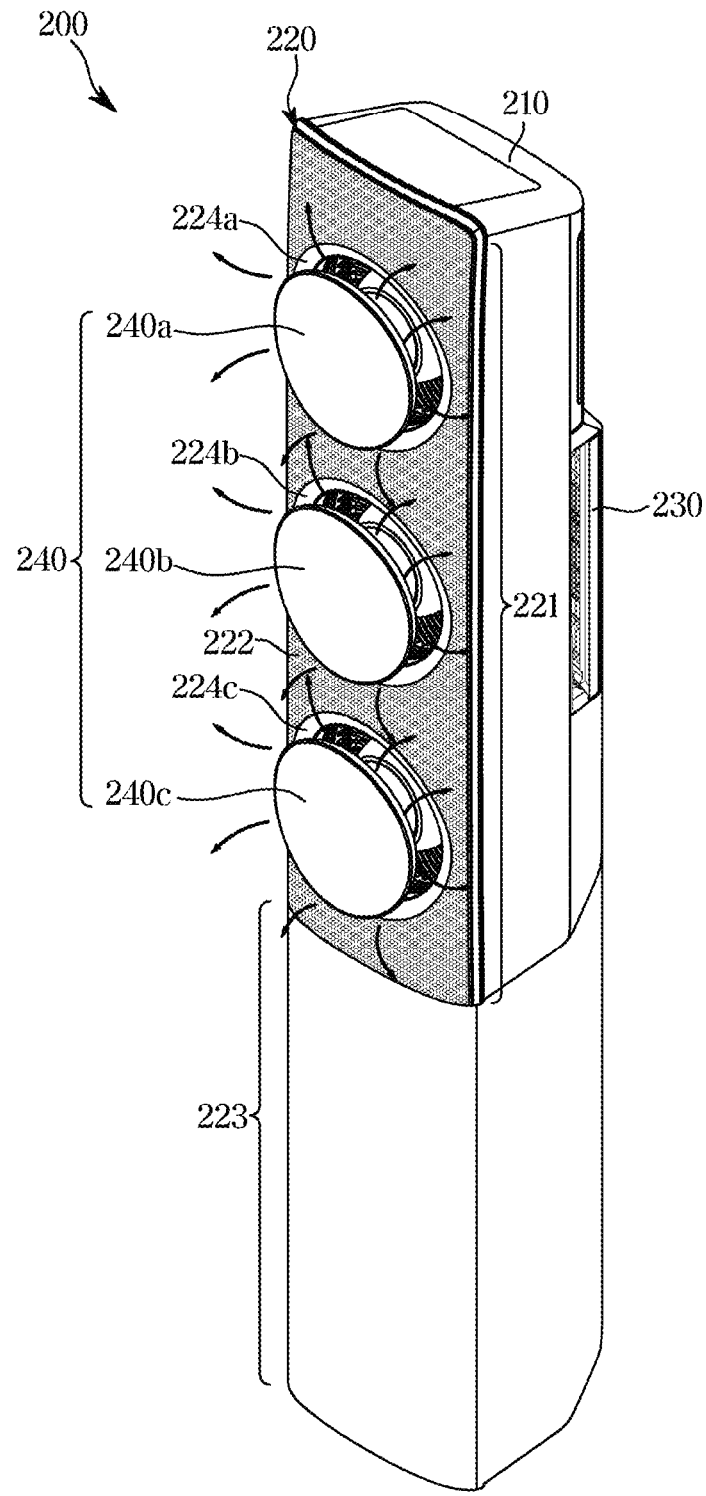
FIG. 6 is an exterior view of an air conditioner according to another embodiment.

FIG. 6 is an exterior view of an air conditioner according to another embodiment.

Referring to FIG. 6, an indoor unit 200 according to another embodiment may include a body case 210 and a front panel 220 having an upper area 221 and a lower area 223. In addition, the indoor unit 200 may include at least one discharge port 224: 224a, 224b, and 224c of the front panel 220 and at least one door 240 capable of opening and closing the discharge port 224. For example, the door 240 may include a first door 240a, a second door 240b, and a third door 240c. The discharge port 224 may include a first discharge port 224a, a second discharge port 224b, and a third discharge port 224c. The discharge port 224 and the door 240 may be provided at the upper area 221 of the front panel 220. The front panel 220 may have a plurality of holes 222 distinguished from the discharge port 224. The plurality of holes 222 may be provided in a region where the discharge port 224 is not formed. A size of each of the plurality of holes 222 is smaller than that of discharge port 224.

The discharge port 224 is provided such that heat-exchanged air is directly discharged to the outside. That is, the discharge port 224 may be exposed to the outside of the indoor unit 200. The discharge port 224 may be open or closed using the door 240 and the heat-exchanged air may be discharged out of the indoor unit 200 selectively through the discharge port 224. When the discharge port 224 is open using the door 240, heat-exchanged air may be discharged through the discharge port 224. For example, the first discharge port 224a may be open using the first door 240a, the second discharge port 224b may be open using the second door 240b, and the third discharge port 224c may be closed using the third door 240c. In this case, the heat-exchanged air may be discharged through the first discharge port 224a and the second discharge port 224b and the heat-exchanged air may not be discharged through the third discharge port 224c.

The door 240 and the discharge port 224 may be provided in the same number and may be arranged in the one-to-one correspondence manner. The door 240 may have a shape corresponding to a shape of the discharge port 224. For example, the discharge port 224 and the door 240 may have circular shapes.

The plurality of blower fans 161, 162, and 163 and/or the circular fan 165 may be arranged in the body case 210 to correspond to the discharge port 224: 224a, 224b, and 224c. For example, the first blower fan 161 may be located at the lowest position to correspond to the third discharge port 224c, the second blower fan 162 may be located at a middle position to correspond to the second discharge port 224b, and the third blower fan 163 may be located at the highest position to correspond to the first discharge port 224a.

As another example, the circular fan 165, instead of the third blower fan 163, may be located at the higher position to correspond to the first discharge port 224a. That is, the heat-exchanged air may partially be discharged out of the indoor unit 200 through the first discharge port 224a by the operation of the circular fan 165. Also, the heat-exchanged air may partially be discharged through the third discharge port 224c by the operation of the first blower fan 161. The flow path of the air flowing by the circular fan 165 may be different from flow paths of air flowing by the plurality of blower fans 161, 162, and 163. In other words, when the circular fan 165 is located at the higher position to correspond to the first discharge port 224a, the flow path connected to the first discharge port 224a may be separated from the flow paths connected to the other discharge ports (second discharge port 224b and third discharge port 224c).

The door 240 may move between an open position where the discharge port 224 is open and a closed position where the discharge port 224 is closed. The door 240 may move in a forward/backward direction between the open position and the closed position. The door 240 may be moved by a door actuator (not shown).

Although not shown in FIG. 6, the indoor heat exchanger 30 and the blower fan assembly 160 described above in FIGS. 2 and 3 may be arranged in the body case 210.

An air inlet 230 may be provided at the rear portion of the body case 210. Air introduced through the air inlet 230 is heat-exchanged in the heat exchanger 30, and the heat-exchanged air may be discharged out of the indoor unit 200 (into the indoor space) through the discharge port 224. Also, the heat-exchanged air may be discharged out of the indoor unit 200 (into the indoor space) through the plurality of holes 222 of the front panel 220.

In other words, when the discharge port 224 is open using the door 240, the heat-exchanged air may be discharged into the indoor space through the discharge port 224 and the plurality of holes 222 of the front panel 220. When the discharge port 224 is closed using the door 240, the heat-exchanged air may be discharged out of the indoor unit 200 (into the indoor space) through the plurality of holes 222 of the front panel 220. A wind speed of the air discharged through the plurality of holes 222 may be lower than that of the air discharged through the discharge port 224. As such, the indoor unit 200 may control the door 240 to open or close the discharge port 224 and may switch the flow path of the air introduced into an air inlet 230.

Meanwhile, the indoor unit 200 according to another embodiment may not include the second inlet 15, the circular fan 165, the distribution device 55, the first duct 18, the second duct 19, and the guide outlets 13 and 14 which are described above in FIGS. 2 and 3. In the front panel 220, the plurality of holes 222 may be omitted.

Figure 7:
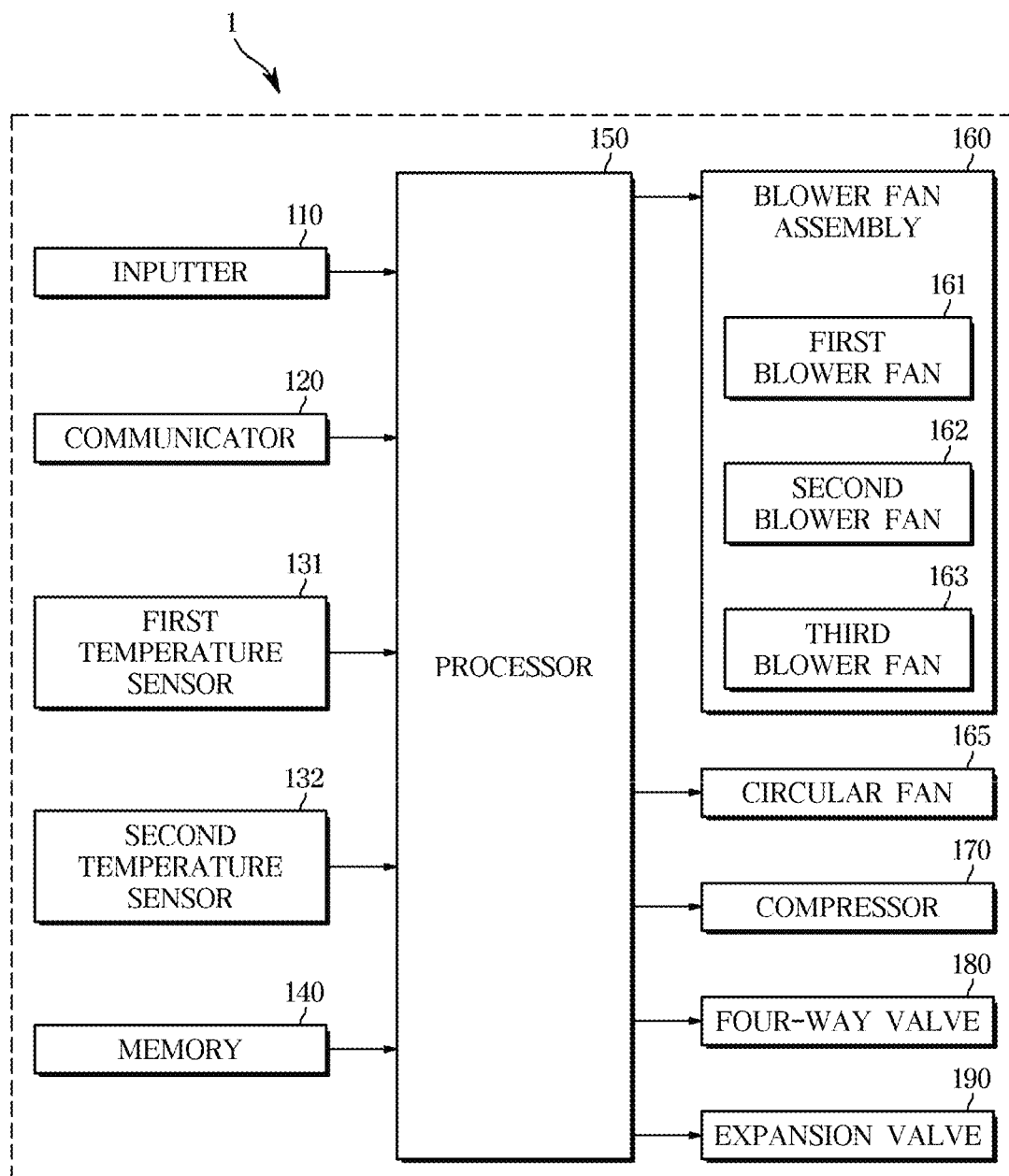
FIG. 7 is a control block diagram of an air conditioner according to an embodiment.

FIG. 7 is a control block diagram of an air conditioner according to an embodiment.

Referring to FIG. 7, the air conditioner 1 may include an inputter 110, a communicator 120, a first temperature sensor 131, a second temperature sensor 132, a memory 140, a processor 150, a blower fan assembly 160, a circular fan 165, a compressor 170, a four-way valve 180, and an expansion valve 190.

The inputter 110, the communicator 120, the first temperature sensor 131, the second temperature sensor 132, the memory 140, the processor 150, and the blower fan assembly 160 may be provided in the indoor units 1b and 200. In addition, the indoor units 1b and 200 may include a circular fan 165. The compressor 170, the four-way valve 180, and the expansion valve 190 may be included in the outdoor unit 1a. The processor 150 may be electrically connected to components of the air conditioner 1 and may control operation of each component. The outdoor unit 1a may include a processor.

Some (e.g., circular fan) of the components of the air conditioner 1 illustrated in FIG. 7 may be omitted. In addition, any components other than those illustrated in FIG. 7 may be added to the air conditioner 1. It would be obvious to those of ordinary skill in the art that mutual positions of the components may be changed in accordance with performance and structure of a system.

The inputter 110 may obtain a user input related to the operation of the air conditioner 1 from the user. In addition, the inputter 110 may transmit an electrical signal (voltage or current) corresponding to the user input to the processor 150. The processor 150 may control the operation of the air conditioner 1 based on the electrical signal received from the inputter 110.

The inputter 110 may include a plurality of buttons provided on the housing 10 of the indoor unit 1b. For example, the inputter 110 may include an operation mode button to select the cooling operation or the heating operation, a temperature button to set a target temperature of the indoor space (air conditioning space), an airflow direction button to set a direction of an airflow, and/or an airflow volume button to set a wind speed (rotational speed of a fan).

The plurality of buttons may include a push switch operating by a press of the user, a membrane switch, and/or a touch switch operating by a touch of a body part.

The inputter 110 may include a remote control provided separately from the air conditioner 1 and a receiver to receive a wireless signal from the remote control. The remote control may also include a plurality of buttons such as the operation mode button, the temperature button, the airflow direction button, and the airflow volume button.

The communicator 120 may communicate with an access point (AP, not shown) separately provided in the air conditioning space and may be connected to a network via the access point. The communicator 120 may communicate with a user terminal device (e.g., smartphone) via the access point. The communicator 120 may receive information of the user terminal device that accesses the access point and transmit the information of the user terminal device to the processor 150. In addition, the communicator 120 may receive position information (e.g., global positioning system (GPS) signal) of the user terminal device from the user terminal device and transmit the received position information to the processor 150. To this end, the communicator 120 may include a wired communication module or a wireless communication module well known in the art.

The first temperature sensor 131 may be provided on the front panel 40 of the indoor unit housing 10 and may measure temperature of heat-exchanged air discharged through the front panel 40. The second temperature sensor 132 may be located at a portion of the indoor heat exchanger 30 (e.g., the front surface of the indoor heat exchanger 30), and may measure a temperature of air heat-exchanged while passing through the indoor heat exchanger 30. The second temperature sensor 132 may detect a condensation temperature of the refrigerant condensed in the indoor heat exchanger 30 during the heating operation. Any one of the first temperature sensor 131 and the second temperature sensor 132 may be omitted from the indoor unit 1b. Each of the first temperature sensor 131 and the second temperature sensor 132 may transmit an electrical signal (voltage or current) corresponding to a measured temperature to the processor 150.

In addition, the air conditioner 1 may include various temperature sensors. For example, a temperature sensor to measure a temperature of an indoor space in which the indoor unit 1b is located and temperature sensors to measure temperatures of air introduced through the first inlet 12 and the second inlet 15 may be provided. The temperature sensors may include a thermistor whose electrical resistance value changes according to temperature.

The memory 140 may record/store a variety of information required for the operation of the air conditioner 1. The memory 140 may store instructions, applications, data, and/or programs required for the operation of the air conditioner 1. For example, the memory 140 may store data on rotational speeds of the plurality of blower fans 161, 162, and 163. For example, the memory 140 may include data on rotational speeds of the blower fans 161, 162, and 163 corresponding to a cooling operation or a heating operation and data on rotational speeds of the blower fans 161, 162, and 163 corresponding to the airflow volume settings. In addition, the memory 140 may include data on rotational speeds of the circular fan 16 corresponding to temperature of the heat-exchanged air. The rotational speeds of the blower fans 161, 162, and 163 and the circular fan 165 may be defined as revolutions per minute (RPM).

The memory 140 may include a volatile memory temporarily storing data such as static random-access memory (S-RAM) and dynamic random-access memory (D-RAM) and a non-volatile memory storing data for a long time such as read only memory (ROM), erasable programmable read only memory (EPROM), and electrically erasable programmable read only memory (EEPROM).

The processor 150 may generate a control signal to control the operation of the air conditioner 1 based on the instructions, applications, data, and/or programs stored in the memory 140. The processor 150 may include logic circuits and arithmetic circuits as hardware components. The processor 150 may process data in accordance with a program and/or instructions provided by the memory 140 and generate a control signal in accordance with a processing result. The memory 140 and the processor 150 may be implemented as a single control circuit or a plurality of circuits. As an example, the processor 150 may be implemented as a single processor or a plurality of processors.

The compressor 170 may circulates the refrigerant in a refrigerant circulation circuit including the compressor 170, the four-way valve 180, the outdoor heat exchanger 32, the expansion valve 190, and the indoor heat exchanger 30 in response to the control signal of the processor 150. Specifically, the compressor 170 may compress a gas-phase refrigerant and discharge a high-temperature/high-pressure gas-phase refrigerant. In addition, the compressor 170 may not operate in an air blowing operation that does not require cooling and heating operations.

The four-way valve 180 may switch the circulation direction of the refrigerant discharged from the compressor 170 under the control of the processor 150. That is, the four-way valve 180 may switch the circulation direction of the refrigerant discharged from the compressor 170 based on whether the air conditioner is to perform the cooling operation or the heating operation. Specifically, the four-way valve 180 guides the refrigerant compressed by the compressor 170 to the outdoor heat exchanger 32 during the cooling operation and guides the refrigerant compressed by the compressor 170 to the indoor heat exchanger 30 during the heating operation.

The expansion valve 190 may decompress the refrigerant. Also, the expansion valve 190 may adjust the amount of the refrigerant to be sufficient for heat exchange in the outdoor heat exchanger 32 or the indoor heat exchanger 30. The expansion valve 190 decompresses the refrigerant by using the throttling effect by which the pressure of the refrigerant decreases while passing through a narrow flow channel. The expansion valve 190 may be an electronic expansion valve (EEV) whose degree of opening is adjustable by an electrical signal.

The blower fan assembly 160 may include a plurality of blower fans 161, 162, and 163. The plurality of blower fans 161, 162, and 163 may blow the air heat-exchanged in the indoor heat exchanger 30 out of the indoor units 1b and 200. As the blower fan assembly 160 is driven, external air may be introduced into the housing 10 through the first inlet 12. The air introduced into the housing 10 exchanges heat with the refrigerant flowing in the indoor heat exchanger 30 while passing through the indoor heat exchanger 30. The air heat-exchanged by the indoor heat exchanger 30 may pass through the blower fan assembly 160 to be discharged out of the housing 10 through the main outlet 17 of the first frame 16 and the plurality of holes 42 of the front panel 40.

The plurality of blower fans 161, 162, and 163 included in the blower fan assembly 160 may operate under the control of the processor 150. Each of the plurality of blower fans 161, 162, and 163 may include a fan motor and rotate using a power generated by the fan motor. The plurality of blower fans 161, 162, and 163 may operate in the cooling operation or the heating operation.

In the cooling operation or the heating operation, rotational speeds of the first blower fan 161 located at the lowest position, the second blower fan 162 located in the middle, and the third blower fan 163 located at the highest position may be set differently. When the first blower fan 161, the second blower fan 162, and the third blower fan 163 operate at the same rotational speed, abnormal noise may be caused by resonance.

In the cooling operation, among the plurality of blower fans 161, 162, and 163, the rotational speed of the third blower fan 163 located at the highest position may be set to the highest level. A first rotational speed of the first blower fan 161 located at the lowest position may be set to the lowest level. In other words, the first rotational speed of the first blower fan 161 may be adjusted to be lower than a third rotational speed of the third blower fan 163 located at the highest position.

In addition, during the cooling operation, the first rotational speed of the first blower fan 161 may be adjusted to be lower than a second rotational speed of the second blower fan 162 located at an upper position. Alternatively, the first rotational speed of the first blower fan 161 may be adjusted to be higher than the second rotational speed of the second blower fan 162 as long as the rotational speed of the third blower fan 163 located at the highest position is maintained at the highest level.

Cold air that is relatively denser than warm air tends to sink down. Therefore, to blow cooling air farther, the processor 150 may adjust a rotational speed of a blower fan located at a higher position (e.g., third blower fan) to be higher than a rotational speed of a blower fan located at a lower position (e.g., first blower fan) during the cooling operation.

However, warm air tends to rise up. Therefore, when the rotational speed of the third blower fan 163 located at the highest position is set to the highest level during the heating operation, the heating air cannot be uniformly distributed in the indoor space. In other words, when the heating air is discharged from the highest position of the indoor unit 1b or 200 at the highest speed during the heating operation, warm air rising up stays above cold air and the cold air accumulate below the warm air. That is, temperature stratification quickly occurs in the indoor space and a thickness of the accumulating low-temperature air increases on the floor of the indoor space.

As the degree of temperature stratification increases, a time for increasing the temperature of the indoor air to a target temperature for heating increases. That is, it is difficult to mix the cold air of the indoor space with the heating air discharged from the indoor unit 1b or 200, so that heating rate decreases and heating efficiency is reduced. Therefore, the operations of the blower fans 161, 162, and 163 during the heating operation need to be controlled differently from the operations of the blower fans 161, 162, and 163 during the cooling operation.

Therefore, in the heating operation, among the plurality of blower fans 161, 162, and 163, the first rotational speed of the first blower fan 161 located at the lowest position may be adjusted to be higher than the second rotational speed of the second blower fan 162 located at an upper position. In addition, the first rotational speed of the first blower fan 161 may be adjusted to be higher than the rotational speed of the third blower fan 163 located at the highest position. In other words, in the heating operation, the first rotational speed of the first blower fan 161 may be set to the highest level. The second rotational speed of the second blower fan 162 may be adjusted to be lower than the third rotational speed of the third blower fan 163 as long as the first rotational speed of the first blower fan 161 is maintained at the highest level.

In addition, the processor 150 may determine the first rotational speed of the first blower fan 161 and the second rotational speed of the second blower fan 162 such that a difference between the first rotational speed of the first blower fan 161 and the second rotational speed of the second blower fan 162 meets a predetermined value based on the set airflow volume. A difference between the first rotational speed of the first blower fan 161 and the third rotational speed of the third blower fan 163 and a difference between the second rotational speed of the second blower fan 162 and the third rotational speed of the third blower fan 163 may also be determined based on the set airflow volume.

As described above, temperature stratification may be reduced by setting the rotational speed of the first blower fan 161 to the highest level during the heating operation, and thus heating rates may be increased.

The circular fan 165 may introduce external air into the indoor unit housing 10 and discharge the introduced air out of the indoor unit 1b through the guide outlets 13 and 14. By the operation of the circular fan 165, air may be introduced into the housing 10 through the second inlet 15. The air introduced through the second inlet 15 may partially flow along the second flow path S2 to be discharged out of the housing 10 through the first guide outlet 13 or partially flow along the third flow path S3 to be discharged out of the housing 10 through the second guide outlet 14.

The circular fan 165 may operate under the control of the processor 150. The circular fan 165 include a fan motor and rotate using a power generated by the fan motor. For example, the circular fan 165 may operate during the cooling operation or the heating operation. The circular fan 165 may also operate during the air blowing operation that does not require cooling and heating operations.

During the heating operation, the operation of the circular fan 165 may be appropriately controlled to reduce temperature stratification of the indoor air and increase heating rates. The processor 150 may control the operation of the circular fan 165 based on the temperature of the heat-exchanged air discharged through the main outlet 17 during the heating operation. The temperature of the heat-exchanged air may be measured by the first temperature sensor 131 provided at the front panel 40 of the indoor unit housing 10 and/or the second temperature sensor 132 of the indoor heat exchanger 30.

For example, the processor 150 may increase the rotational speed of the circular fan 165 in response to an increase in temperature of the heat-exchanged air. When the temperature of the heat-exchanged air reaches a first temperature, the processor 150 may turn on the circular fan 165 and operate the circular fan 165 at a minimum rotational speed.

When the temperature of the heat-exchanged air reaches a second temperature higher than the first temperature, the processor 150 may operate the circular fan 165 at a rotational speed higher than the minimum rotational speed and corresponding to the set airflow volume.

To distinguish the rotational speed of the circular fan 165 from each of the rotational speeds of the first blower fan 161, the second blower fan 162, and the third blower fan 163, the rotational speed of the circular fan 165 may be referred to as 'fourth rotational speed'. Alternatively, when the indoor unit 1b or 200 includes two blower fans (e.g., a first blower fan located at a lower position and a second blower fan located at a higher position), the rotational speed of the circular fan 165 may also be referred to as 'third rotational speed'.

During the heating operation, temperature stratification of indoor air may further be reduced and heating rates may further be increased by controlling the operation of the circular fan 165 provided in the indoor unit 1b based on the temperature of the heat-exchanged air.

Hereinafter, a method of controlling the air conditioner 1 according to an embodiment will be described in more detail. The method of controlling the air conditioner 1 to be described below may be applied to the air conditioner 1 of the above-described embodiments.

Figure 8:
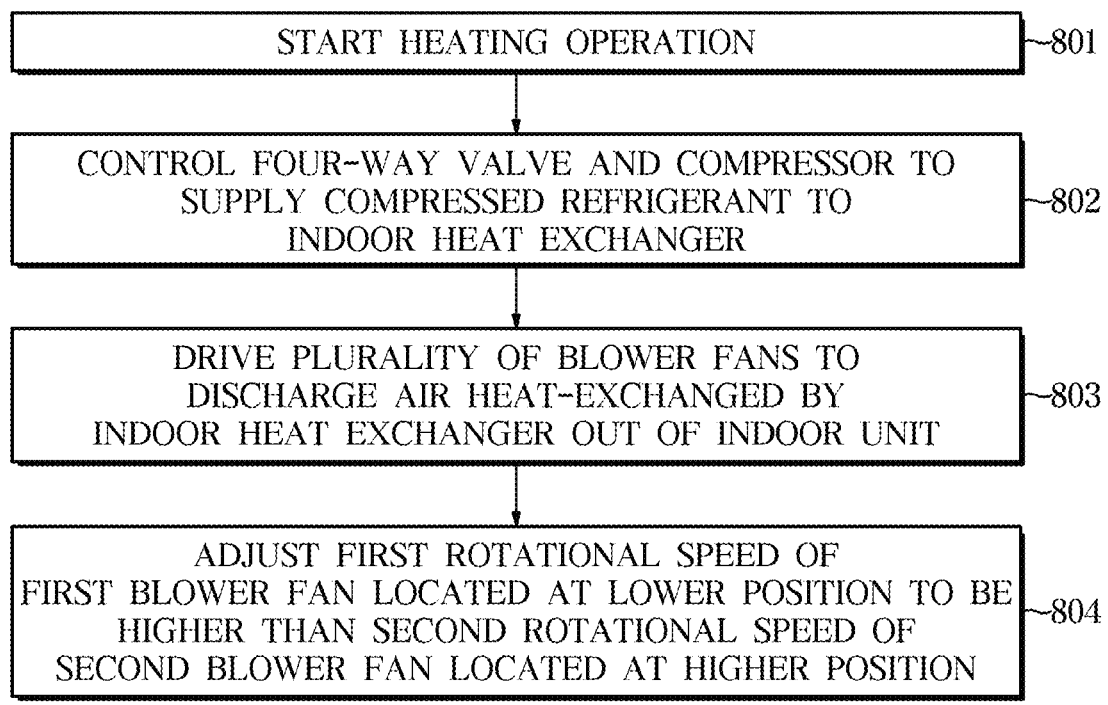
FIG. 8 is a flowchart for describing a method of controlling an air conditioner during a heating operation.
Figure 10:
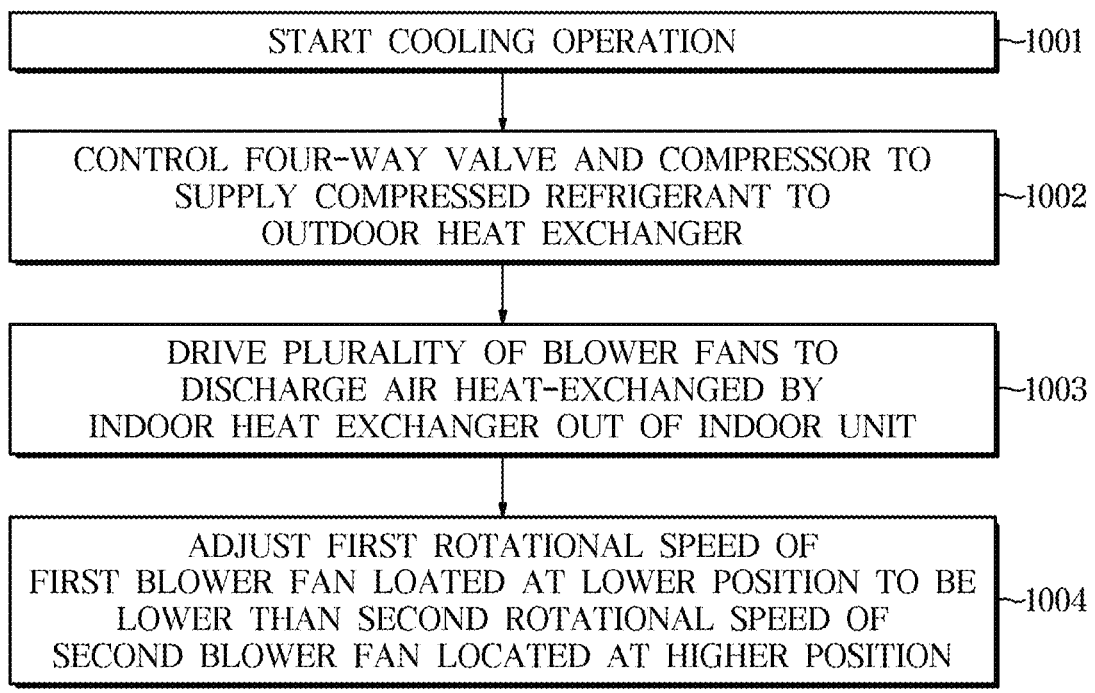
FIG. 10 is a flowchart for describing a method of controlling an air conditioner when switching from a heating operation to a cooling operation.
Figure 11:
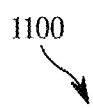
FIG. 11 is a table exemplarily showing rotational speeds of blower fans in a heating operation and a cooling operation.

FIG. 8 is a flowchart for describing a method of controlling an air conditioner during a heating operation. FIG. 9 is a table exemplarily showing rotational speeds of blower fans according to set airflow volumes during a heating operation. FIG. 10 is a flowchart for describing a method of controlling an air conditioner during a cooling operation. FIG. 11 is a table exemplarily showing rotational speeds of blower fans during a heating operation and a cooling operation.

Referring to FIG. 8, the air conditioner 1 may start a heating operation (801). The processor 150 of the air conditioner 1 may perform the heating operation based on a start command of the heating operation obtained by the inputter 110. When the power of the air conditioner 1 is turned on, the processor 150 may automatically perform the heating operation based on a temperature of the indoor space. The processor 150 may control the compressor 170 and the four-way valve 180 to supply the refrigerant from the compressor 170 to the indoor heat exchanger 30 for the heating operation (802). The processor 150 may control the four-way valve 180 to allow the refrigerant to flow in the order of the compressor 170, the indoor heat exchanger 30, the expansion valve 190, and the outdoor heat exchanger 32 for the heating operation.

In addition, the processor 150 may drive the plurality of blower fans 161, 162, and 163 such that the air heat-exchanged by the indoor heat exchanger 30 is discharged out of the indoor unit 1b or 200 (803). As the plurality of blower fans 161, 162, and 163 rotate, air outside the indoor unit 1b or 200 is introduced into the indoor unit 1b or 200 and the introduced air may be heated while passing through the indoor heat exchanger 30. The air heat-exchanged by the indoor heat exchanger 30 may be discharged out of the housing 10 through the main outlet 17 of the first frame 16 and the plurality of holes 42 of the front panel 40 after passing through the blower fan assembly 160. In the case of the indoor unit 200 shown in FIG. 6, the heat-exchanged air may be discharged out of the indoor unit 200 through at least one of the first discharge port 224a located at an upper position, the second discharge port 224b located in the middle, or the third discharge port 224c located at the lower position.

The processor 150 may adjust the first rotational speed of the first blower fan 161 located at the lowest position to be higher than the second rotational speed of the second blower fan 162 located at an upper position among the plurality of blower fans (804). The processor 150 may determine the first rotational speed of the first blower fan 161 and the second rotational speed of the second blower fan 162 such that a difference between the first rotational speed of the first blower fan 161 and the second rotational speed of the second blower fan 162 meets a predetermined value based on the set airflow volume.

For example, the intensity (airflow volume) of a wind discharged from the indoor unit 1b or 200 may be set to strong wind, medium wind, or weak wind.

The airflow volume may be selected by the user or automatically selected based on the temperature of the indoor space. As another example, the airflow volume may be divided into 5 levels (Level 1 to Level 5) and one of the 5 levels may be selected. At a higher level, a stronger wind may be discharged. In accordance with the set airflow volume, the rotational speed of each of the blower fans 161, 162, and 163 may be determined within a range of 1050 RPM to 1450 RPM.

Referring to the table 900 of FIG. 9, when the strong wind is selected as the airflow volume during the heating operation, the first rotational speed of the first blower fan 161 may be set to 1350 RPM, the second rotational speed of the second blower fan 162 may be set to 1250 RPM, and the third rotational speed of the third blower fan 163 may be set to 1150 RPM. When the medium wind is selected as the airflow volume during the heating operation, the first rotational speed of the first blower fan 161 may be set to 1250 RPM, the second rotational speed of the second blower fan 162 may be set to 1150 RPM, and the third rotational speed of the third blower fan 163 may be set to 1050 RPM. That is, during the heating operation, the first rotational speed of the first blower fan 161 located at the lowest position may be determined to be the highest level. The first rotational speed of the first blower fan 161 and the second rotational speed of the second blower fan 162 may be determined to have a difference of 100 RPM therebetween. A difference between the second rotational speed of the second blower fan 162 and the third rotational speed of the third blower fan 163 may also be 100 RPM.

As described above, temperature stratification of indoor air may be reduced and heating rates may be increased by setting the rotational speed of the first blower fan 161 located at the lowest position to the highest level during the heating operation.

Referring to FIG. 10, the air conditioner 1 may start a cooling operation (1001). The processor 150 of the air conditioner 1 may perform the cooling operation based on a start command of the cooling operation obtained by the inputter 110. When the power of the air conditioner 1 is turned on, the processor 150 may also automatically perform the cooling operation based on a temperature of the indoor space.

The processor 150 may control the compressor 170 and the four-way valve 180 to supply the refrigerant from the compressor 170 to the outdoor heat exchanger 32 for the cooling operation (1002). The processor 150 may control the four-way valve 180 to allow the refrigerant to flow in the order of the compressor 170, the outdoor heat exchanger 32, the expansion valve 190, and the indoor heat exchanger 30 for the cooling operation.

In the cooling operation, the processor 150 may drive the plurality of blower fans 161, 162, and 163 such that the air heat-exchanged by the indoor heat exchanger 30 is discharged out of the indoor unit 1b or 200 (1003). As the plurality of blower fans 161, 162, and 163 rotate, air outside the indoor unit 1b or 200 is introduced into the indoor unit 1b or 200 and the introduced air may be cooled while passing through the indoor heat exchanger 30. The air cooled in the indoor unit 1b of FIG. 1 may be discharged out of the indoor unit 1b through the plurality of holes 42 of the front panel 40. The air cooled in the indoor unit 200 of FIG. 6 may be discharged through at least one of the first discharge port 224a located at an upper position, the second discharge port 224b located in the middle, the third discharge port 224c located at the lower position, and the plurality of holes 222 of the front panel 220.

During the cooling operation, the processor 150 may adjust the first rotational speed of the first blower fan 161 located at the lowest position to be lower than the second rotational speed of the second blower fan 162 located at an upper position among the plurality of blower fans (1004). Unlike the operations of the blower fans 161, 162, and 163 during the heating operation, the third rotational speed of the third blower fan 163 located at the highest position may be set to the highest level during the cooling operation. Therefore, cooling air may be blown farther.

In addition, in the cooling operation, the processor 150 may also determine the first rotational speed of the first blower fan 161 and the second rotational speed of the second blower fan 162 such that a difference between the first rotational speed of the first blower fan 161 and the second rotational speed of the second blower fan 162 meets a predetermined value based on the set airflow volume.

Referring to a table 1100 of FIG. 11, rotational speeds of the respective blower fans 161, 162, and 163 during the heating operation and the cooling operation are exemplarily shown in the case where the strong wind is selected as the airflow volume. As described above in the table 900 of FIG. 9, the first rotational speed of the first blower fan 161 may be set to 1350 RPM, the second rotational speed of the second blower fan 162 may be set to 1250 RPM, and the rotational speed of the third blower fan 163 may be set to 1150 RPM during the heating operation. However, during the cooling operation, the first rotational speed of the first blower fan 161 may be set to 1150 RPM, the second rotational speed of the second blower fan 162 may be set to 1250 RPM, and the rotational speed of the third blower fan 163 may be set to 1350 RPM. In other words, upon comparison between the heating operation and the cooling operation, the first rotational speed of the first blower fan 161 located at the lowest position may be opposite to the third rotational speed of the third blower fan 163 located at the highest position. As described above, the operations of the blower fans 161, 162, and 163 may be controlled appropriately for the cooling operation and the heating operation, respectively.

Figure 12:
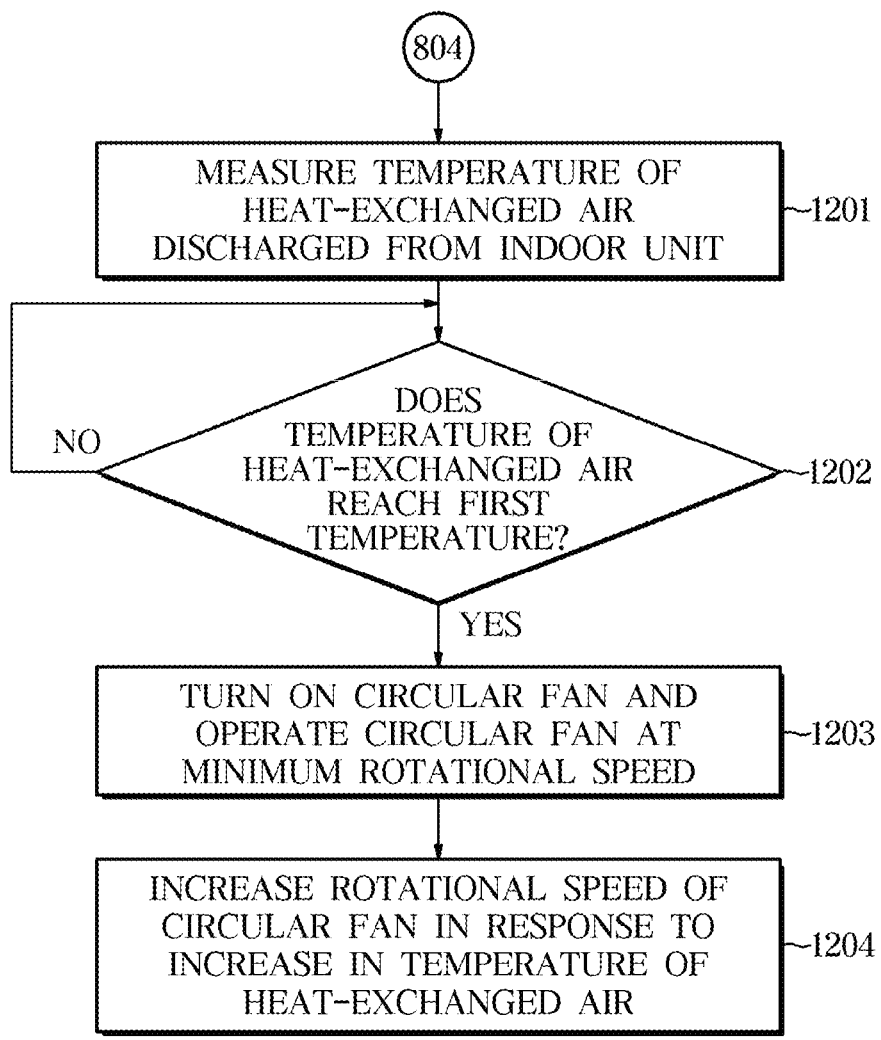
FIG. 12 is a flowchart for describing a method of controlling an air conditioner for an operation of a circular fan during a heating operation.
Figure 13:
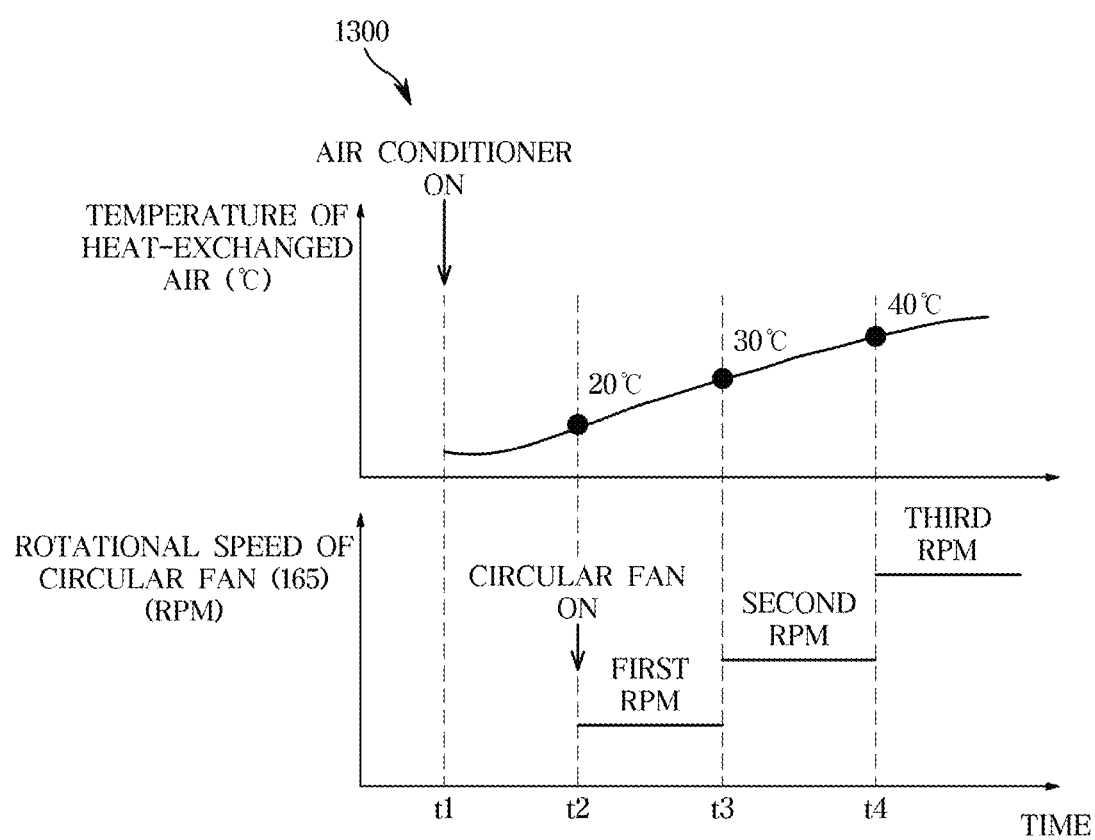
FIG. 13 is a graph for describing an operation of a circular fan during a heating operation.

FIG. 12 is a flowchart for describing a method of controlling an air conditioner in terms of the operation of a circular fan during a heating operation. FIG. 13 is a graph for describing the operation of a circular fan during a heating operation.

Referring to FIG. 12, the processor 150 of the air conditioner 1 may control the first temperature sensor 131 to measure temperature of heat-exchanged air discharged out of the indoor unit 1b or 200 (1201). Also, the processor 150 may control the second temperature sensor 132 to measure a temperature of heat-exchanged air passing through the indoor heat exchanger 30. The processor 150 may control the operation of the circular fan 165 based on the temperature of heat-exchanged air discharged during a heating operation. The rotational speed of the circular fan 165 may be determined within a range of 400 RPM to 800 RPM.

Air introduced into the indoor unit 1b by the operation of the circular fan 165 may be discharged out of the indoor unit 1b through the first guide outlet 13 and the second guide outlet 14. The air flowing by the circular fan 165 may not pass through the indoor heat exchanger 30. In another embodiment, air introduced into the indoor unit 1b by the operation of the circular fan 165 may pass through a heat exchanger. The air discharged out of the indoor unit 1b or 200 by the operation of the circular fan 165 may be mixed with the air discharged out of the indoor unit 1b or 200 by the blower fans 161, 162, and 163. As described above, the flow path of air flowing by the circular fan 165 (e.g., second flow path and third flow path) may be separated from the flow path of air flowing by the plurality of blower fans 161, 162, and 163 (e.g., first flow path).

When the temperature of the heat-exchanged air reaches a first temperature (1202), the processor 150 may turn on the circular fan 165 and operate the circular fan 165 at a minimum rotational speed (1203). The first temperature may be preset and may be 20° C. The minimum rotational speed may be 400 RPM.

In addition, in response to an increase in temperature of the heat-exchanged air, the processor 150 may increase the rotational speed of the circular fan 165 (1204). When the temperature of the heat-exchanged air reaches a second temperature higher than the first temperature, the processor 150 may operate the circular fan 165 at a rotational speed higher than the minimum rotational speed and corresponding to the set airflow volume.

Referring to a graph 1300 of FIG. 13, the air conditioner 1 may be turned on and a heating operation may be started at a time point t1. By the heating operation, the temperature of heat-exchanged air discharged from the indoor unit 1b increases. At a time point t2 where the temperature of the heat-exchanged air reaches a first temperature (20° C.), the processor 150 may turn on the circular fan 165 and operate the circular fan 165 at a first RPM. The first RPM is a minimum rotational speed of the circular fan 165 and may be, for example, 400 RPM.

In response to an increase in temperature of the heat-exchanged air, the processor 150 may increase the rotational speed of the circular fan 165. At a time point t4 where the temperature of the heat-exchanged air reaches a second temperature 40° C. after continuously increasing, the processor 150 may operate the circular fan 165 at a third RPM corresponding to the set airflow volume. For example, when the strong wind is selected as the airflow volume, the rotational speed of the circular fan 165 may be set to 700 RPM from the time point t4. Data on the rotational speeds of the circular fan 165 corresponding to temperatures of heat-exchanged air and data on rotational speeds of the circular fan 165 corresponding to set airflow volumes may be previously stored in the memory 140.

The rotational speed of the circular fan 165 may be maintained at the first RPM from the time point t2 to a time point t3 where the temperature of the heat-exchanged air reaches a third temperature (30° C.). In addition, from the time point t3 to the time point t4, the rotational speed of the circular fan 165 may be maintained at a second RPM. The second RPM may be determined to be higher than the first RPM and lower than the third RPM. For example, the second RPM may be 500 RPM.

As described above, by adjusting the rotational speed of the circular fan 165 in cooperation with the temperature of the heat-exchanged air, unpleasant feelings of a user caused by non-heat-exchanged air (in direct contact with cold air) may be removed.

Figure 14:
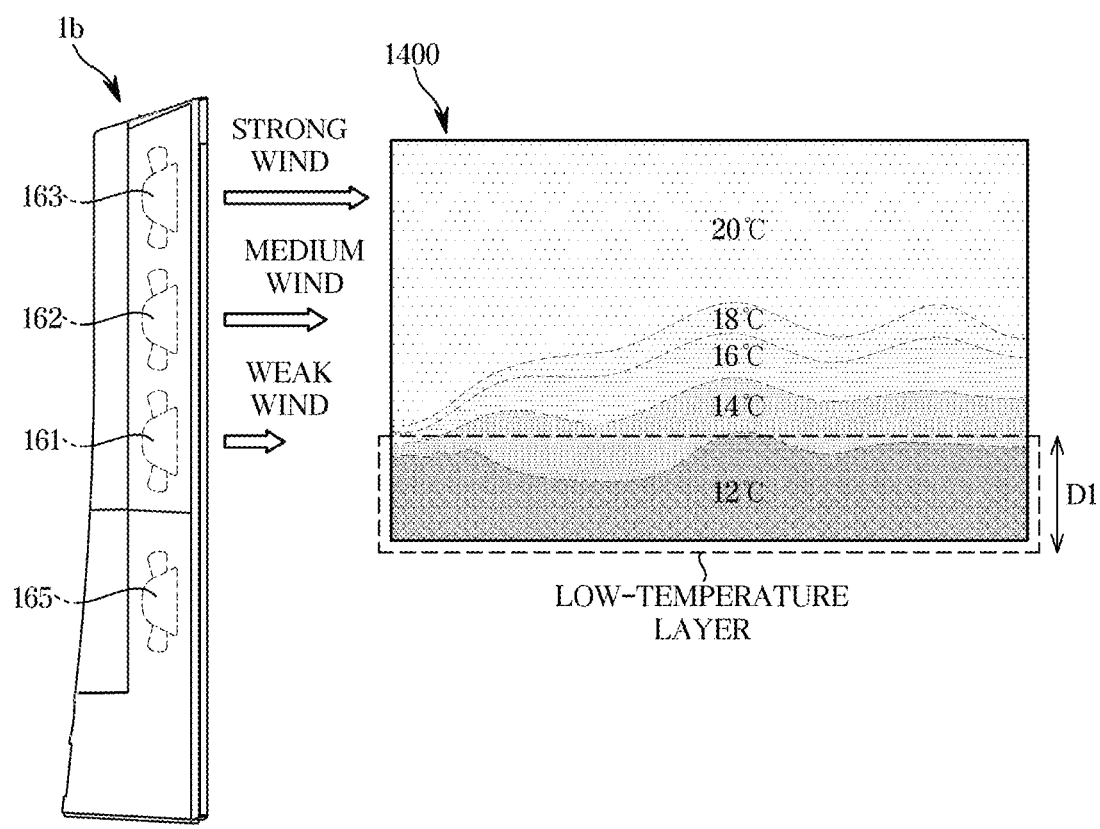
FIG. 14 is a first temperature distribution graph showing indoor temperature distribution during a heating operation according to Comparative Example.
Figure 15:
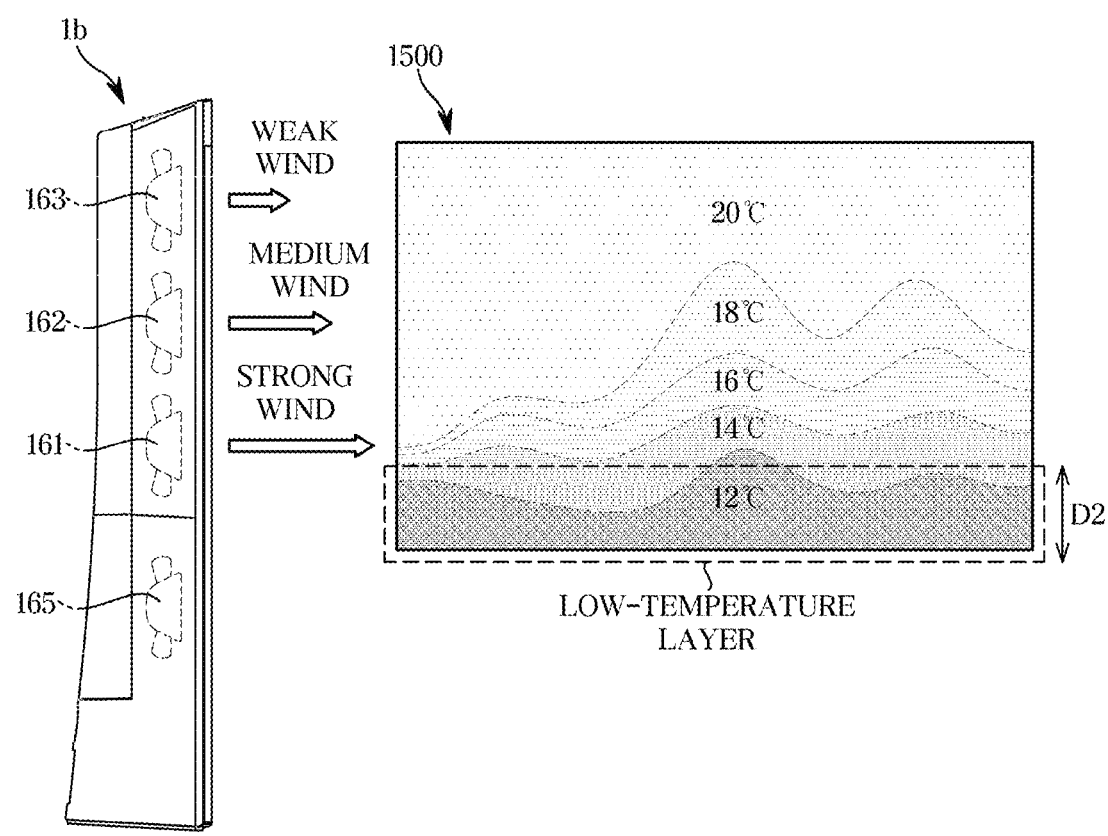
FIG. 15 is a second temperature distribution graph showing indoor temperature distribution during a heating operation according to Experimental Example 1.
Figure 16:
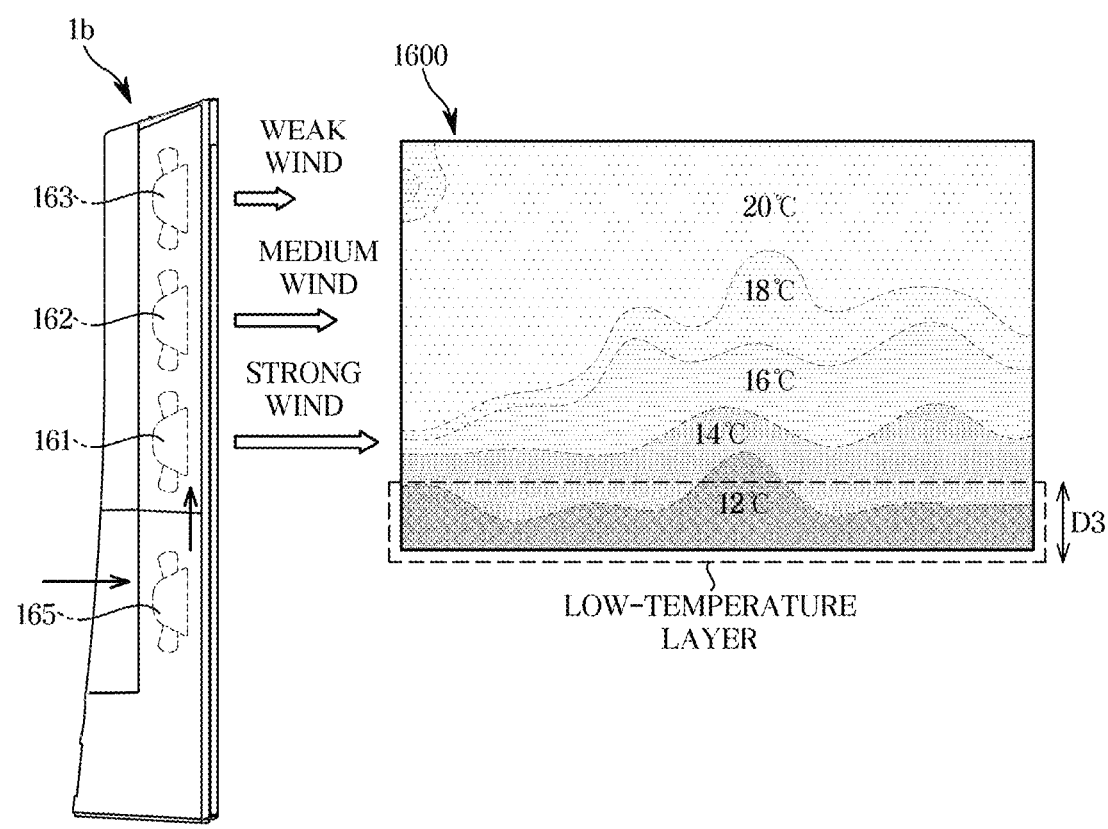
FIG. 16 is a third temperature distribution graph showing indoor temperature distribution during a heating operation according to Experimental Example 2.

FIG. 14 is a first temperature distribution diagram illustrating Comparative Example of distribution of indoor temperature during a heating operation. FIG. 15 a second temperature distribution diagram illustrating Experimental Example 1 of distribution of indoor temperature during a heating operation. FIG. 16 is a third temperature distribution diagram illustrating Experimental Example 2 of distribution of indoor temperature during a heating operation. FIG. 17 is a table illustrating heating rates of Comparative Example, Experimental Example 1, and Experimental Example 2.

Graphs of FIGS. 14, 15, and 16 show temperature distribution of indoor air after a heating operation is performed for 15 minutes.

Referring to the first temperature distribution diagram 1400 of FIG. 14, during the heating operation, the rotational speed of the third blower fan 163 located at the highest position of the indoor unit 1b is set to the highest level, and the rotational speed of the first blower fan 161 located at the lowest position is set to the lowest level. In this case, warm air discharged from the highest position with the highest speed cannot be mixed with cold air located therebelow in the indoor space. Therefore, temperature stratification of the indoor air occurs and a thickness D1 of a low-temperature layer at a lower portion of the indoor space increases.

Referring to the second temperature distribution diagram 1500 of FIG. 15, during the heating operation, the rotational speed of the first blower fan 161 located at the lowest position of the indoor unit 1b is set to the highest level, and the rotational speed of the third blower fan 163 located at the highest position of the indoor unit 1b is set to the lowest level. In this case, warm air discharged from the first blower fan 161 may be mixed with cold air located at a lower portion of the indoor space. Upon comparison of the second temperature distribution diagram 1500 of FIG. 15 with the first temperature distribution diagram 1400 of FIG. 14, it may be confirmed that temperature stratification of the indoor air is reduced and a thickness D2 of a lower-temperature layer decreases.

Referring to the third temperature distribution diagram 1600 of FIG. 16, during the heating operation, the first rotational speed of the first blower fan 161 located at the lowest position of the indoor unit 1b is set to the highest level and the circular fan 165 operates together. The circular fan 165 may suck cold air located at a lower portion of the indoor space and discharge the sucked cold air through the first guide outlet 13 and the second guide outlet 14. The cold air discharged through the first guide outlet 13 and the second guide outlet 14 may be mixed with warm air discharged from the blower fans 161, 162, and 163. Therefore, the temperature stratification of the indoor air may further be reduced. When the graph 1600 of FIG. 16 is compared with the first temperature distribution diagram 1400 of FIG. 14 and the second temperature distribution diagram 1500 of FIG. 15, it may be confirmed that temperature stratification of the indoor air is further reduced and a thickness D3 of a low-temperature layer further decreases.

Referring to a table 1700 of FIG. 17, it is confirmed that heating rates increase by setting the rotational speed of the first blower fan 161 located at the lowest position to the highest level during the heating operation. A shorter time required to increase the temperature of the indoor air to a target heating temperature indicates a quicker heating rate. The table 1700 of FIG. 17 shows time taken to increase the temperature of the indoor air from a temperature prior to heating of 9° C. to a target heating temperature of 20° C. during the heating operation.

Under circumstances that the temperature distribution of the indoor air is shown as in the first temperature distribution diagram 1400 of FIG. 14, a first time taken to reach the target heating temperature of 20° C. is measured as 27 minutes and 26 seconds. Under circumstances that the temperature distribution of the indoor air is shown as in the temperature distribution diagram 1500 of FIG. 15, a second time taken to reach the target heating temperature of 20° C. is measured as 25 minutes and 26 seconds. In addition, under circumstances that the temperature distribution of the indoor air is shown as in the temperature distribution diagram 1600 of FIG. 16, a third time taken to reach the target heating temperature of 20° C. is measured as 21 minutes and 25 seconds.

Assuming that the first time (27 minutes and 26 seconds) as 100%, the second time (25 minutes and 26 seconds) is calculated as 93% of the first time and the third time (21 minutes 25 seconds) is calculated as 78% of the first time. That is, it was confirmed that the highest heating rate may be obtained during the heating operation by setting the rotational speed of the first blower fan 161 located at the lowest position of the indoor unit 1b to the highest level and by operating the circular fan 165 together.

As described above, according to the disclosed air conditioner and the method of controlling the same, temperature stratification of the indoor air may be reduced and heating rates may be increased by increasing the rotational speed of the blower fan located at a lower portion during the heating operation.

Also, according to the disclosed air conditioner and the method of controlling the same, the operations of the blower fans provided in the indoor unit may be performed differently during the cooling operation and the heating operation.

In addition, according to the air conditioner and the method of controlling the same, user's satisfaction with the airflow discharged from the air conditioner may be improved during the heating operation by controlling the operation of the circular fan provided in the indoor unit based on the temperature of the heat-exchanged air. In addition, temperature stratification of the indoor air may be reduced and heating rates may be increased by the operation of the circular fan.

Meanwhile, the aforementioned embodiments may be embodied in the form of a recording medium including instructions executable by a computer. The instructions may be stored in the form of program codes and perform the operation of the disclosed embodiments by creating a program module when executed by a processor.

The device-readable storage media may be provided in the form of non-transitory storage media. Here, the term "non-transitory storage media" is a tangible device and only means that it does not include a signal (e.g., electromagnetic wave), and the term does not distinguish between a case where data is stored semi-permanently in a storage media and a case where data is stored temporarily in a storage media. For example, the "non-transitory storage media" may include a buffer in which data is temporarily stored.

The methods according to the embodiments disclosed herein may be provided while included in a computer program product. The computer program product may be traded as merchandise between a seller and a purchaser. The computer program product may be distributed in the form of a device-readable storage medium (e.g., compact disc read only memory (CD-ROM)), or may be distributed (e.g., downloaded or uploaded) online through an application store (e.g., Play Store.™.) or directly between two user devices (e.g., smartphones). In the case of the online distribution, at least a part of the computer program product (e.g., downloadable app) may be temporarily stored in a device-readable storage medium such as a server of a manufacturer, a server of an application store, or a memory of a relay server, or may be temporarily generated.

It will be understood by one of ordinary skill in the art that the embodiments of the disclosure are provided for illustration and may be implemented in different ways without departing from the spirit and scope of the disclosure. Therefore, it should be understood that the foregoing embodiments are provided for illustrative purposes only and are not to be construed in any way as limiting the disclosure.

What is claimed is:

1. An air conditioner comprising:
   an indoor unit housing;
   an indoor heat exchanger configured to exchange heat with air flowing into the indoor unit housing;
   a compressor configured to compress a refrigerant for a cooling operation or a heating operation performed by the air conditioner;
   a four-way valve configured to switch a circulation direction of the refrigerant based on whether the air conditioner is to perform the cooling operation or the heating operation;
   a first blower fan located in the indoor unit housing and configured to blow heat-exchanged air out of the indoor unit housing;
   a second blower fan located in the indoor unit housing at a higher position than the first blower fan and configured to blow heat-exchanged air out of the indoor unit housing;
   a third blower fan located in the indoor unit housing at a higher position than the second blower fan and configured to blow heat-exchanged air out of the indoor unit housing; and
   a processor electrically connected to the compressor, the four-way valve, the first blower fan, the second blower fan, and the third blower fan, and configured to adjust a rotational speed of the first blower fan, a rotational speed of the second blower fan, and a rotational speed of the third blower fan so that, during the heating operation,
      the rotational speed of the first blower fan is higher than the rotational speed of the second blower fan and higher than the rotational speed of the third blower fan, and
      the rotational speed of the second blower fan is lower than the rotational speed of the third blower fan while the rotational speed of the first blower fan is maintained at a rotational speed that is higher than the rotational speed of the second blower fan and higher than the rotational speed of the third blower fan.

2. The air conditioner according to claim 1, wherein the processor is configured to adjust the rotational speed of the first blower fan, the rotational speed of the second blower fan, and the rotational speed of the third blower fan so that, during the heating operation,
   a difference between the rotational speed of the first blower fan and the rotational speed of the second blower fan meets a predetermined value based on a set airflow volume,
   a difference between the rotational speed of the first blower fan and the rotational speed of the third blower fan is based on the set airflow volume, and
   a difference between the rotational speed of the second blower fan and the rotational speed of the third blower fan is based on the set airflow volume.

3. The air conditioner according to claim 1, wherein the processor is configured to adjust the rotational speed of the first blower fan, the rotational speed of the second blower fan, and the rotational speed of the third blower fan so that, during the cooling operation,
   the rotational speed of the third blower fan is higher than the rotational speed of the second blower fan and higher than the rotational speed of the first blower fan, and
   the rotational speed of the first blower fan is lower or higher than the rotational speed of the second blower fan while the rotational speed of the third blower fan is higher than the rotational speed of the second blower fan and higher than the rotational speed of the first blower fan.

4. The air conditioner according to claim 1, further comprising:
   a main outlet located at a front position of the indoor unit housing and configured to discharge heat-exchanged air flowing through a first flow path;
   a guide outlet located adjacent to the main outlet; and
   a fan located in the indoor unit housing and configured to blow air along a second flow path separated from the first flow path to the guide outlet,
   wherein the guide outlet is configured to discharge the air blown to the guide outlet in a forward direction of the indoor unit housing, and the processor is configured to control the fan based on a temperature of the heat-exchanged air discharged by the main outlet during the heating operation.

5. The air conditioner according to claim 4, wherein the processor is configured to increase a rotational speed of the fan in response to an increase in the temperature of the heat-exchanged air discharged by the main outlet during the heating operation.

6. The air conditioner according to claim 4, wherein the processor is configured to turn on the fan and operate the fan at a minimum rotational speed based on the temperature of the heat-exchanged air discharged by the main outlet during the heating operation reaching a first temperature.

7. The air conditioner according to claim 6, wherein the processor is configured to operate the fan at a rotational speed higher than the minimum rotational speed and corresponding to a set airflow volume based on the temperature of the heat-exchanged air discharged by the main outlet during the heating operation reaching a second temperature higher than the first temperature.

8. The air conditioner according to claim 4, further comprising:
   a temperature sensor located at a front panel of the indoor unit housing, a front surface of the indoor heat exchanger, or both the front panel of the indoor unit housing and the front surface of the indoor heat exchanger, and configured to measure a temperature of the heat-exchanged air discharged by the main outlet.

9. An air conditioner comprising:
   an indoor unit housing;
   an indoor heat exchanger configured to exchange heat with air introduced into the indoor unit housing;

a first blower fan located in the indoor unit housing and configured to blow heat-exchanged air out of the indoor unit housing;

a second blower fan located in the indoor unit housing at a higher position than the first blower fan, and configured to blow heat-exchanged air out of the indoor unit housing;

a third blower fan located in the indoor unit housing at a higher position than the second blower fan and configured to blow heat-exchanged air out of the indoor unit housing; and a processor configured to:
adjust a rotational speed of the first blower fan, a rotational speed of the second blower fan, and a rotational speed of the third blower fan so that, during a heating operation of the air conditioner,
the rotational speed of the first blower fan is higher than the rotational speed of the second blower fan and higher than the rotational speed of the third blower fan, and
the rotational speed of the second blower fan is lower than the rotational speed of the third blower fan while the rotational speed of the first blower fan is maintained at a rotational speed that is higher than the rotational speed of the second blower fan and higher than the rotational speed of the third blower fan, and
adjust the rotational speed of the first blower fan, the rotational speed of the second blower fan, and the rotational speed of the third blower fan so that, during a cooling operation of the air conditioner,
the rotational speed of the third blower fan is higher than the rotational speed of the second blower fan and higher than the rotational speed of the first blower fan, and
the rotational speed of the first blower fan is lower or higher than the rotational speed of the second blower fan while the rotational speed of the third blower fan is higher than the rotational speed of the second blower fan and higher than the rotational speed of the first blower fan.

10. The air conditioner of claim 9, wherein the processor is configured to adjust the rotational speed of the first blower fan, the rotational speed of the second blower fan, and the rotational speed of the third blower fan so that, during the heating operation,
a difference between the rotational speed of the first blower fan and the rotational speed of the second blower fan meets a predetermined value based on a set airflow volume,
a difference between the rotational speed of the first blower fan and the rotational speed of the third blower fan is based on the set airflow volume, and
a difference between the rotational speed of the second blower fan and the rotational speed of the third blower fan is based on the set airflow volume.

11. The air conditioner of claim 9, further comprising:
a main outlet located at a front position of the indoor unit housing and configured to discharge heat-exchanged air flowing through a first flow path;
a guide outlet located adjacent to the main outlet; and
a fan located in the indoor unit housing and configured to blow air along a second flow path separated from the first flow path to the guide outlet,
wherein the guide outlet is configured to discharge the air blown to the guide outlet in a forward direction of the indoor unit housing, and the processor is configured to control the fan based on a temperature of the heat-exchanged air discharged by the main outlet during the heating operation.

12. The air conditioner of claim 11, wherein the processor is configured to increase a rotational speed of the fan in response to an increase in the temperature of the heat-exchanged air discharged by the main outlet during the heating operation.

13. The air conditioner of claim 11, wherein the processor is configured to turn on the fan and operate the fan at a minimum rotational speed based on the temperature of the heat-exchanged air discharged by the main outlet during the heating operation reaching a first temperature.

14. The air conditioner of claim 13, wherein the processor is configured to operate the fan at a rotational speed higher than the minimum rotational speed and corresponding to a set airflow volume based on the temperature of the heat-exchanged air discharged by the main outlet during the heating operation reaching a second temperature higher than the first temperature.

15. A method of controlling an air conditioner that includes an indoor unit housing, an indoor heat exchanger configured to exchange heat with air flowing into the indoor unit housing, a compressor configured to compress a refrigerant for a cooling operation or a heating operation performed by the air conditioner, a first blower fan located in indoor unit housing and configured to blow heat-exchanged air out of the indoor unit housing, a second blower fan located in the indoor unit housing at a higher position than the first blower fan and configured to blow heat-exchanged air out of the indoor unit housing, and a third blower fan located in the indoor unit housing at a higher position than the second blower fan and configured to blow heat-exchanged air out of the indoor unit housing, the method comprising:
adjusting a rotational speed of the first blower fan, a rotational speed of the second blower fan, and a rotational speed of the third blower fan so that, during the heating operation,
the rotational speed of the first blower fan is higher than the rotational speed of the second blower fan and higher than the rotational speed of the third blower fan, and
the rotational speed of the second blower fan is lower than the rotational speed of the third blower fan while the rotational speed of the first blower fan is maintained at a rotational speed that is higher than the rotational speed of the second blower fan and higher than the rotational speed of the third blower fan.

16. The method of claim 15, further comprising:
adjusting the rotational speed of the first blower fan, the rotational speed of the second blower fan, and the rotational speed of the third blower fan so that, during the cooling operation,
the rotational speed of the third blower fan is higher than the rotational speed of the second blower fan and higher than the rotational speed of the first blower fan, and
the rotational speed of the first blower fan is lower or higher than the rotational speed of the second blower fan while the rotational speed of the third blower fan is higher than the rotational speed of the second blower fan and higher than the rotational speed of the first blower fan.

* * * * *